(12) United States Patent
Felse et al.

(10) Patent No.: US 9,466,044 B2
(45) Date of Patent: Oct. 11, 2016

(54) USE OF ORGANIZATION CHART TO DIRECT MAIL ITEMS FROM CENTRAL RECEIVING AREA TO ORGANIZATIONAL ENTITIES USING CLUSTERS BASED ON A UNION OF LIBRARIES

(71) Applicant: Bank of America Corporation, Charlotte, NC (US)

(72) Inventors: Mark D. Felse, Indian Land, SC (US); David T. Frew, Fort Mill, SC (US); John B. Hall, Charlotte, NC (US); Tessa R. Cooke, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 782 days.

(21) Appl. No.: 13/901,678

(22) Filed: May 24, 2013

(65) Prior Publication Data
US 2014/0351158 A1    Nov. 27, 2014

(51) Int. Cl.
G06F 15/18 (2006.01)
G06Q 10/08 (2012.01)
H04L 12/58 (2006.01)

(52) U.S. Cl.
CPC ............. *G06Q 10/083* (2013.01); *H04L 51/14* (2013.01)

(58) Field of Classification Search
CPC ...................................................... H04L 51/14
USPC ........................................ 706/12, 20, 45, 62
See application file for complete search history.

(56) References Cited

U.S. PATENT DOCUMENTS

| | | | |
|---|---|---|---|
| 7,251,637 B1 * | 7/2007 | Caid ................. | G06F 17/30256 706/15 |
| 2003/0114956 A1 | 6/2003 | Cullen et al. | |
| 2006/0008114 A1 | 1/2006 | Sekiguchi et al. | |
| 2008/0008379 A1 * | 1/2008 | Andel ................. | G06K 9/2054 382/141 |
| 2008/0008383 A1 * | 1/2008 | Andel ...................... | G06K 9/00 382/173 |
| 2008/0120129 A1 * | 5/2008 | Seubert .................. | G06Q 10/06 705/35 |
| 2009/0164390 A1 | 6/2009 | Calman et al. | |
| 2009/0254572 A1 * | 10/2009 | Redlich .................. | G06Q 10/06 |
| 2011/0235854 A1 | 9/2011 | Berger et al. | |
| 2014/0207818 A1 * | 7/2014 | Jellick ................... | H04L 41/082 707/771 |
| 2015/0081816 A1 * | 3/2015 | Trevelyan ............... | H04L 51/14 709/206 |

OTHER PUBLICATIONS

"Neural Network Toolbox," The MathWorks, Inc. (registrant), Natick, Massachusetts, retrieved on May 19, 2013.

(Continued)

*Primary Examiner* — David Vincent
(74) *Attorney, Agent, or Firm* — Weiss & Arons LLP; Michael A. Springs, Esq.

(57) ABSTRACT

Apparatus, methods, media and code for routing a mail item are provided. The apparatus may include a processor device; and machine readable memory. The processor device may be configured to: assign a unique destination identifier to an organizational entity; aggregate into an aggregate documents that were addressed to the entity and received by the entity; and store in the machine readable memory the unique destination identifier and a library that includes unique terms in the aggregate.

21 Claims, 18 Drawing Sheets

(56) References Cited

OTHER PUBLICATIONS

"Neuro AI—Intelligent systems and Neural Networks" (http://www.learnartificialneuralnetworks.com), Hola in Company (registrant), Puerto Real, Spain, retrieved on Apr. 28, 2013.
"k-means clustering" (http://en.wikipedia.org/wiki/K-means_clustering), Wikimedia Foundation, Inc. (registrant), San Francisco, California, retrieved on May 9, 2013.
"Damerau-Levenshtein distance," (http://en.wikipedia.org/wiki/Damerau%E2%80%93Levenshtein_distance), Wikimedia Foundation, Inc. (registrant), San Francisco, California, retrieved on May 9, 2013.
Harkenrider, Nathan, "How Does Email Work, Anyway?" (http://www.optify.net/marketing-technology/how-does-email-work-anyway), Optify.net(registrant), Jacksonville, Florida, retrieved on Mar. 22, 2013.
"Envelope-content splitting," (https://en.wikipedia.org/wiki/Envelope-content_splitting), Wikimedia Foundation, Inc. (registrant), San Francisco, California, retrieved on Apr. 11, 2013.
"Email address," (http://en.wikipedia.org/wiki/Email_address), Wikimedia Foundation, Inc. (registrant), San Francisco, California, retrieved on Apr. 11, 2013.
"Amplop surat—Translation and Definition of message envelope in Indonesian," TermWiki.com, Carl Yao (registrant), Shrewsbury, Massachusetts, retrieved on Apr. 11, 2013.
"Email," (https://en.wikipedia.org/wiki/Email), Wikimedia Foundation, Inc. (registrant), San Francisco, California, retrieved on Apr. 10, 2013.
"Envelope Types" Google image from Designersinsights.com, Contact Privacy Inc. Customer 0124822704 (registrant), Toronto, Ontario, retrieved on Apr. 22, 2013.
"Correspondence Envelope Sizes" (http://www. GraphicConnectionkc.com), David Vancura (registrant), Lake Winnebago, Missouri, retrieved on Apr. 22, 2013.
"Announcement Envelope Sizes ('Bar' Sizes—Pointed Flaps)" (http://www.GraphicConnectionkc.com), David Vancura (registrant), Lake Winnebago, Missouri, retrieved on Apr. 22, 2013.
"Announcement Envelope Sizes ('A' Sizes)" (http://www. GraphicConnectionkc.com), David Vancura (registrant), Lake Winnebago, Missouri, retrieved on Apr. 22, 2013.
"Neural Network Toolbox," The MathWorks, Inc. (registrant), Natick, Massachusetts, May 19, 2013.
"Neuro AI—Intelligent systems and Neural Networks" (http://www.learnartificialneuralnetworks.com), Hola in Company (registrant), Puerto Real, Spain, Apr. 28, 2013.
"k-means clustering" (http://en.wikipedia.org/wiki/K-means_clustering), Wikimedia Foundation, Inc. (registrant), San Francisco, California, May 9, 2013.
"Damerau-Levenshtein distance," (http://en.wikipedia.org/wiki/Damerau%E2%80%93Levenshtein_distance), Wikimedia Foundation, Inc. (registrant), San Francisco, California, May 9, 2013.
Harkenrider, Nathan, "How Does Email Work, Anyway?" (http://www.optify.net/marketing-technology/how-does-email-work-anyway), Optify.net(registrant), Jacksonville, Florida, Mar. 22, 2013.
"Envelope-content splitting," (https://en.wikipedia.org/wiki/Envelope-content_splitting), Wikimedia Foundation, Inc. (registrant), San Francisco, California, Apr. 11, 2013.
"Email address," (http://en.wikipedia.org/wiki/Email_address), Wikimedia Foundation, Inc. (registrant), San Francisco, California, Apr. 11, 2013.
"Amplop surat—Translation and Definition of message envelope in Indonesian," TermWiki.com, Carl Yao (registrant), Shrewsbury, Massachusetts, Apr. 11, 2013.
"Email," (https://en.wikipedia.org/wiki/Email), Wikimedia Foundation, Inc. (registrant), San Francisco, California, Apr. 10, 2013.
"Envelope Types" Google image from Designersinsights.com, Contact Privacy Inc. Customer 0124822704 (registrant), Toronto, Ontario, Apr. 22, 2013.
"Correspondence Envelope Sizes" (http://www. GraphicConnectionkc.com), David Vancura (registrant), Lake Winnebago, Missouri, Apr. 22, 2013.
"Announcement Envelope Sizes ('Bar' Sizes—Pointed Flaps)" (http://www. GraphicConnectionkc.com), David Vancura (registrant), Lake Winnebago, Missouri, Apr. 22, 2013.
"Announcement Envelope Sizes ('A' Sizes)" (http://www. GraphicConnectionkc.com), David Vancura (registrant), Lake Winnebago, Missouri, Apr. 22, 2013.

* cited by examiner

PLEASE DETACH AND MAIL COUPON WITH CHECK PAYABLE TO INSTITUTION NAME — 1102

ACCOUNT NUMBER: NNNNNNN — 1116
TOTAL BALANCE: X,XXX.XX — 1118
MINIMUM PAYMENT DUE: XXX.XX — 1120
DUE DATE: MM/DD/YYYY — 1122
ENTER PAYMENT AMOUNT: — 1124
ORGANIZATION NAME — 1126
ORGANIZATION ADDRESS 1 — 1128
ORGANIZATION ADDRESS 2 — 1130
//////////////// — 1132

1100

CHECK THIS BOX IF CHANGE OF MAILING ADDRESS OR PHONE NUMBER IS SHOWN ON BACK OF COUPON — 1104

FCFCFCFC — 1106

CUSTOMER NAME — 1108
CUSTOMER ADDRESS 1 — 1110
CUSTOMER ADDRESS 2 — 1112
//////////////// — 1114

USE OF ORGANIZATION CHART TO DIRECT MAIL ITEMS FROM CENTRAL RECEIVING AREA TO ORGANIZATIONAL ENTITIES USING CLUSTERS BASED ON A UNION OF LIBRARIES

FIELD OF TECHNOLOGY

This application relates to processing mail items. More specifically, the application relates to routing similarly-addressed mail items to different destinations.

BACKGROUND OF THE INVENTION

A large organization may include multiple entities that receive physical communications, such as mail, and electronic communications, such as email. If the organization includes a sufficiently large number of entities, the organization may have a smaller number of communication hubs that service subsets of the entities by receiving communications directed to the entities and distributing the communications to the entities. The hubs and associated subsets may be organized geographically, functionally, operationally or in other ways.

With a large communication volume, it may be difficult to adapt the hubs to changes in entity locations, functions and operations or other characteristics. Also, it may be inefficient to provide to the members of the public, and individuals internal to the organization, current information about the hub addresses for the corresponding organization entities. Also, it may be difficult to properly distribute communications that are insufficiently addressed or that are addressed to the wrong hub or that include erroneous address information.

It would therefore be desirable to have apparatus and methods for routing to an organization entity insufficiently, incorrectly or erroneously addressed communications.

It also would therefore be desirable to have apparatus and methods for servicing the many entities with a smaller number of hubs or a single hub.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 11 shows yet another illustrative work piece that may be processed in accordance with the principles of the invention;

FIG. 13 shows still another illustrative work piece that may be processed in accordance with the principles of the invention;

DETAILED DESCRIPTION OF THE INVENTION

Figure 1:
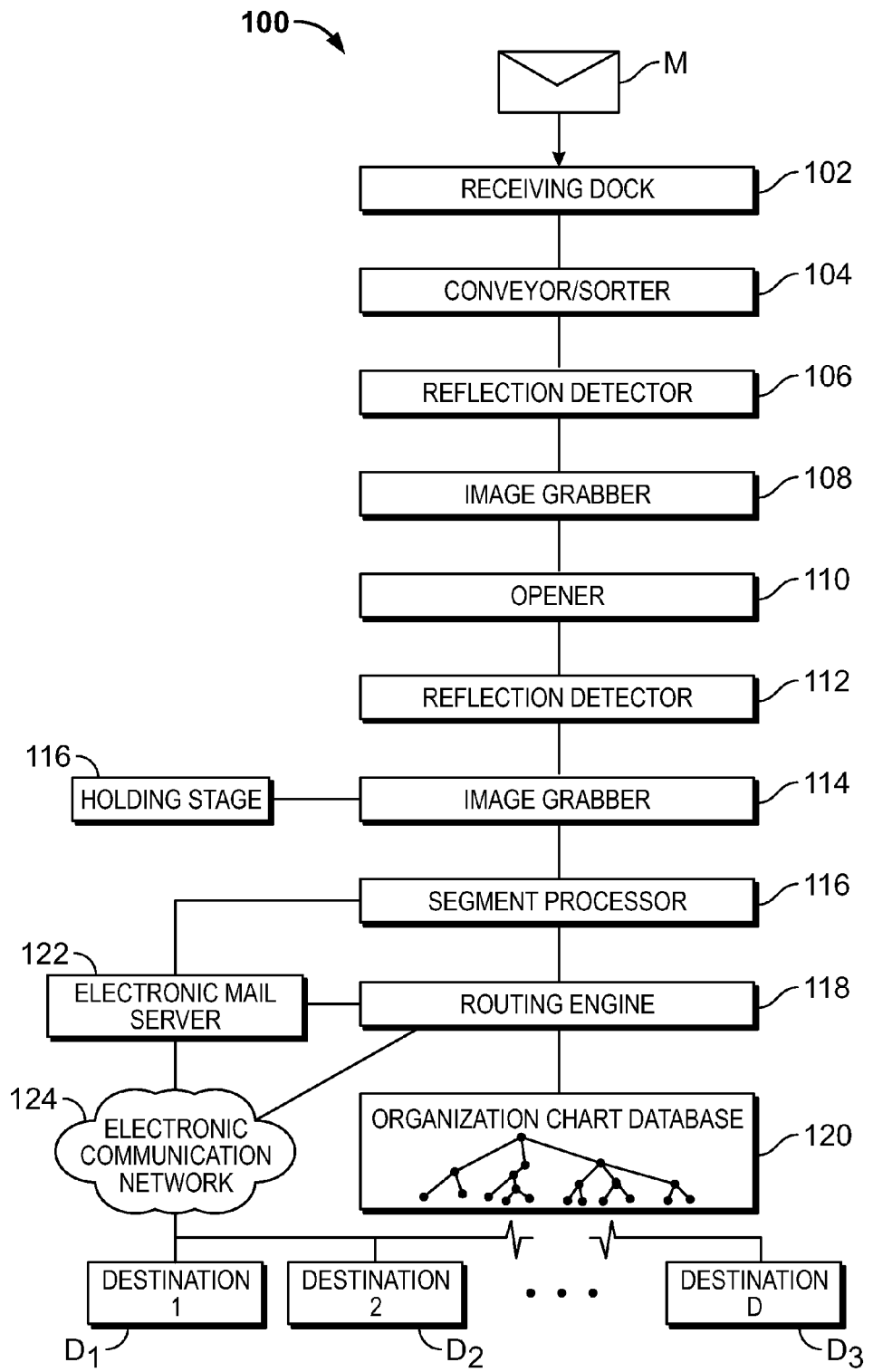
FIG. 1 shows illustrative apparatus, along with an illustrative work piece and related information, in accordance with the principles of the invention.

Apparatus, articles of manufacture including computer readable code and media for processing a mail item are provided. The mail item may be received by an organization. The mail item may be delivered to the organization by U.S. Postal Service, electronic mail, private courier or any other form of delivery. The mail item may include an envelope. The processing may include identifying an entity within the organization to which the mail item or a part thereof can be routed. The entity may be treated as a destination. The destination may be electronically embodied by an email address, a drop box, a physical mail box or any other suitable electronic or physical instrument.

The mail item may include one or more parts. A mail item part may be disposed in the envelope. The envelope may be a mail item part. The mail item part may be a document. For example, the part may be a check, a payment coupon, an invoice, a letter or any other type of document.

The mail item part may include a segment. The segment may be an image of some or all of the mail item part. The segment may include information. An element of the information may be stored as an information parameter. The segment may include textual information. The segment may include color information. The segment may include symbolic information, such as a bar code or a QR code. The segment may include magnetically readable information. The segment may include geometric or pattern information. For example, the segment may include boxes such as those provided on a payment coupon in which a financial institution customer may write numerals of a payment amount.

The segment may include a form field-identifier. The form field-identifier may be textual information that is printed as part of the document. For example, on a check, "PAY TO THE ORDER OF," or any other suitable text, may be a form field. On a payment coupon, "MINIMUM PAYMENT DUE," or any other suitable text, may be a form field. On an invoice, "SUB-TOTAL," or any other suitable text, may be a form field.

The mail item part may include physical features. The physical features may include textural signals. An element of information about a physical feature may be stored as a physical parameter.

Table 1 sets forth illustrative parameters and exemplary data types thereof.

TABLE 1

Illustrative parameters and data types thereof.

| Illustrative Parameter Name | Illustrative Data Types |
|---|---|
| General Parameters | |
| Received date | YYYY-MM-DD |
| Serial no. | 123456 |
| Envelope Exterior Parameters | |
| Physical Parameters | |
| Length | 5 mm increments |
| Width | 5 mm increments |
| Fold-Pattern | A, B, C, . . . based on laser or image scan of folds and seams |
| Size | 1, 2, 3, . . . based on Length and Width |
| Color | Yellow 0-256, Magenta 0-256, Cyan 0-256, Black 0-256 |
| Addressee Window | Yes or No |
| Addressee Window Length | 2 mm increments |
| Addressee Window Width | 2 mm increments |
| Addressee Window origin | (x, y), mm, from lower left corner of envelope |
| Return Address Window | Yes or No |
| Return Address Window Length | 2 mm increments |
| Return Address Window Width | 2 mm increments |
| Return Address Window origin | (x, y), mm, from lower left corner of envelope |
| Information Parameters | |
| Bar Code (linear, 2-D) | Image |
| Addressee Text segment | Image |
| Return Address Text segment | Image |
| Front text segment | Image |
| Back text segment | Image |
| Envelope Front Image | Image |
| Envelope Back Image | Image |
| Mail Item Part Parameters | |
| Number of Mail Item Parts (N) | 1, 2, . . . |
| Part 1 | |
| Part 1 Physical Parameters | |
| Part 1 Length | 5 mm increments |
| Part 1 Width | 5 mm increments |
| Part 1 MICR | Yes or No |
| Part 1 Information Parameters | |
| Part 1 Form Code | String |
| Number of Part 1 Text Segments (P1NT) | 1, 2, . . . |
| Text Segment 1 | Image |
| Text Segment 2 | Image |
| Text Segment P1NT | Image |
| Part 1 Graphic Element | Image |

TABLE 1-continued

Illustrative parameters and data types thereof.

| Illustrative Parameter Name | Illustrative Data Types |
|---|---|
| Part 2 | |
| Part 2 Physical Parameters | |
| Part 2 Length | 5 mm increments |
| Part 2 Width | 5 mm increments |
| Part 2 MICR (Y/N) | Yes or No |
| Part 2 Information Parameters | |
| Part 2 Form Code | String |
| Number of Part 2 Text Segments (P2NT) | 1, 2, . . . |
| Text Segment 1 | Image |
| Text Segment 2 | Image |
| Text Segment P2NT | Image |
| Part 2 Graphic Element | Image |
| Part N | |
| Part N Physical Parameters | |
| Part N Length | 5 mm increments |
| Part N Width | 5 mm increments |
| Part N MICR | Yes or No |
| Part N Information Parameters | |
| Part N Form Code | String |
| Number of Part N Text Segments (PNNT) | 1, 2, . . . |
| Text Segment 1 | Image |
| Text Segment 2 | Image |
| Text Segment PNNT | Image |
| Part N Graphic Element | Image |

The article of manufacture may include non-transitory computer usable media that includes computer readable program code embodied therein. The code when executed by a processor may cause a computer to execute one or more actions in accordance with the invention. The processor may include a processor device. The processor may be a processor device.

The media may include one or more non-transitory computer-readable media storing computer-executable instructions which, when executed by the processor on a computer system, perform methods in accordance with the invention.

Apparatus, articles of manufacture including computer readable code and media for routing the mail item part are provided. The apparatus may include a receiver. The receiver may be configured to receive an image of the mail item part.

The apparatus may include a processor. The processor may be configured to decompose a segment of the mail item part into a string vector.

The string vector may be a vector that has an element that is a text string. The string may be a text string. The mail item part may include an image segment that includes textual information. The textual information may be converted into the text string by any suitable character recognition approach. The string vector may include one or a plurality of text strings.

The processor may be configured to quantify a first closeness between the string vector and a first library vector that corresponds to a first mail item part destination. The processor may be configured to quantify a second closeness between the string vector and a second library vector that corresponds to a second mail item part destination. The processor may be configured to link to the image routing information to route the mail item part to that of the first and second mail item part destinations that corresponds to the greatest of the first and second closeness.

Table 2 shows illustrative vector libraries that correspond to different mail item parts that are commonly received at different destinations. An aggregate of mail item parts that are received by a destination may reflect the most commonly received mail item parts at the destination. Two or more destinations that commonly receive a common kind of mail item part may have different library vectors based on geographic, functional, operational or other differences between the destinations.

The string vector may be a vector of strings. The strings may include alphanumeric characters. The alphanumeric characters may be represented by ASCII characters, encoded ASCII characters, or any other form of character or code, whether binary, hexadecimal or any other encoding scheme.

The library vector may be a vector of strings.

A "closeness" may be a quantitative measure of the similarity between two vectors based on the similarity of the strings in the vectors.

A closeness between two vectors of strings may be represented as a vector of closenesses between members of the two vector strings. For example, the closeness of string vector B to string vector A may be scored, for example, based on Equation 1.

$$C_{\tilde{B}\text{-}\tilde{A}} = \Sigma_{i=1}^{I} \min(|B_i - A_{j, \forall j \in [1,J]}|^{2p})$$  Eqn. 1

The distance $\min|B_i - A_{j, \forall j \in [1,J]}|^2$ is a minimum distance between a member of B and any of the J members of A. p is a multiplier that can be given any appropriate value. p may

TABLE 2

Illustrative library vectors. Terms of the vectors are enclosed in slashes. The top row includes illustrative labels for the vectors.

| Check-Form Library | Payment-Coupon-Form Library | Invoice-Form Library | Manifest-Form Library | Legal-Order-Letter Library | Executive-Letter Library | Customer-Care-Letter Library |
|---|---|---|---|---|---|---|
| /Check No./ | /Please detach and mail coupon with check payable to/ | /Attention/ | /Lading/ | /Pursuant to/ | /CEO/ | /Gratitude/ |
| /Date/ | /Check here for change of mailing address or phone number/ | /Invoice No./ | /Ship to/ | /Order/ | /Chief/ | /Thank you/ |
| /Pay To The Order of/ | /Enter all changes on back of coupon/ | /Statement date/ | /Packaging/ | /Court/ | /Chairman/ | /Outstanding/ |
| /Memo/ | /Account No./ | /Currency/ | /Slip/ | /Estate/ | /Board/ | /Service/ |
|  | /Total balance/ | /Item/ | /Received/ | /Payment/ |  | /Product/ |
|  | /Minimum Payment Due/ | /Description/ | /Back order/ | /Check/ |  | /Suggestion/ |
|  | /Due Date/ | /Quantity/ |  | /Enclosed/ |  | /Future/ |
|  | /Enter payment amount/ | /Qty/ |  | /Account No./ |  | /Contact me/ |
|  | <Box pattern> | /Rate/ |  | /Name of/ |  |  |
|  |  | /Subtotal/ |  |  |  |  |
|  |  | /Tax/ |  |  |  |  |
|  |  | /Total/ |  |  |  |  |
|  |  | /Remit/ |  |  |  |  |

Library vectors may include strings pertaining to tax information, estate information, brokerage information, mortgage information, credit reports or other suitable legal or business information.

be given a large value to intensify the distribution of distances to reduce the effect of non-matching strings. The distance may be calculated, for example, as a Damerau-Levenshtein distance.

The first and second destinations may correspond to entities of an organization, such as a financial institution. The entities may be addressable such that the mail item or the mail item part may be transmitted to the entity. The destination may be a probabilistic prediction of the entity.

Routing may involve associating the mail item or mail item part with the destination.

A routing record may include information about the mail item or the mail item part. The routing record may include the destination. Routing may include populating the routing record with the destination.

The routing record may include one or more physical parameters from the mail item. The routing record may include one or more information parameters from the mail item. One or more physical parameters may be deleted from the routing record after the destination is inserted in the routing record. One or more information parameters may be deleted from the routing record after the destination is inserted in the routing record.

The physical parameters may be stored in a physical parameter record. The information parameters may be stored in an information parameter record. The physical parameter record may be logically associated with, but separate from, the routing record. The information parameter record may be logically associated with, but separate from, the routing record.

The apparatus may include a transmitter configured to transmit the image to that of the first and second mail item part destinations that corresponds to the greatest of the first and second closeness.

The processor may be further configured to decompose into first text strings segments from each of a plurality of first mail item parts that were addressed to the first destination and received by the first destination. The processor may be further configured to rank the first text strings by frequency of occurrence to form a first two-dimensional array. The frequency of occurrence may be a frequency of occurrence in a segment. The frequency of occurrence may be a frequency of occurrence in the mail item part. The frequency of occurrence may be a frequency of occurrence in the mail item.

The processor may be further configured to eliminate rows in the first array that correspond to stop words. The first library may include the first text strings in the remaining rows. The stop words may be words that are frequent and common and thus not helpful for discriminating between different destinations. Stop words may be identified by a user. Stop words may be identified as words that are identified as being above a threshold usage frequency in a population of words. The population may be all or some of the mail items received by the organization. The threshold usage may be set by eliminating rows corresponding to words that, based on one or more commonly available rankings of English language word usage frequency, are used below a selected frequency.

The processor may be further configured to decompose into second text strings segments from each of a plurality of second mail item parts that were addressed to the second destination and received by the second destination.

The processor may be configured to rank the second text strings by frequency of occurrence to form a second two-dimensional array; and eliminate rows in the second array that correspond to stop words, the second library comprising the second text strings in the remaining rows.

The processor may be configured to tally a first number of matches of strings between the string vector and the first library. A match may be an exact match, a word-root-match, a partial match or any other suitable type of match. When the match is a partial match, the user may select an acceptable match level. The match level may be a percentage of matching letters between the strings. The user may select the percentage.

The processor may be configured to tally a second number of matches between the string vector and the second library.

The processor may be configured to score the first number and the second number. The routing information may identify the higher-scoring one of the first destination and the second destination.

In connection with scoring the first number, the processor may be configured to identify the number of text strings in the first library; identify the number of text strings in the string vector; and calculate the multiplicative product of the first number and the reciprocal of (the number of text strings in the first library X the number of text strings in the string vector) to arrive at a first score for the first library.

In connection with scoring the second number, the processor may be configured to identify the number of text strings in the second library; identify the number of text strings in the string vector; and calculate the multiplicative product of the second number and the reciprocal of (the number of text strings in the second library X the number of text strings in the string vector) to arrive at a second score for the second library.

Equation 2 sets forth an illustrative way to quantify score S for nth library L.

$$S_n = \frac{\text{number of matches}}{(\text{no. strings in library } L_n) \times (\text{no. strings in mail item part string vector})} \quad \text{Eqn. 2}$$

The processor may be configured to calculate, when the first and second libraries are members of a plurality of N libraries: a sum of the scores of the libraries; a first probability for the first mail item part destination that is equal to about the first library score divided by the sum; and a second probability for the second mail item part destination that is equal to about the second library score divided by the sum.

Equation 3 sets forth an illustrative way to quantify probability P for a destination when there are N libraries, each corresponding to one of N destinations.

$$P_n = S_n / \Sigma_{n=1}^{N} S_n \quad \text{Eqn. 3}$$

$P_n$ may be expressed as a fraction that ranges from 0 to 1. The processor may be configured to provide the routing information only if the greatest closeness corresponds to a probability that is at least 0.5 greater than a next-greatest closeness corresponding to a different destination. That is, the processor will provide the routing information only if the maximum probability $P_{max_N}$ for the N libraries is greater than or equal to $P_{next\text{-}greatest_N} + 0.5$, where $P_{next\text{-}greatest_N}$ is the probability that is, except for $P_{max_N}$, the greatest of the N probabilities.

The processor may be configured to provide the routing information only if the greatest closeness corresponds to a probability that is at least 5 times greater than a next-greatest closeness corresponding to a different destination. That is, the processor will provide the routing information only if the maximum probability $P_{max_N}$ for the N libraries is greater than or equal to $5 \times P_{next\text{-}greatest_N}$.

The apparatus may include machine readable memory.

The processor device may be configured to: assign a destination identifier to an organizational entity; aggregate into an aggregate documents that were addressed to the entity and received by the entity; and store in the machine readable memory the destination identifier and a library that includes unique terms in the aggregate. "Unique" means having one occurrence in the aggregate. The destination identifier may be a unique destination identifier. The destination identifier may correspond to the entity. The library may correspond to the entity. The entity may correspond to more than one library. For example, the entity may have different libraries that correspond to different document types.

The documents may be mail item parts that are known to have been correctly routed to the entity. The aggregate may include documents of one or more types. The aggregate may include documents of only one type.

The processor device may be configured to route the mail item part to the organizational entity only if the library quantitatively matches the mail item part better than a different library matches the mail item part.

The mail item part may be a first mail item part. The processor device may be configured to route a second mail item part to the organizational entity. The first mail item part and the second mail item part may originate from the same mail item. The second mail item part may match both the library and the different library less than a threshold matching value.

The unique terms may be first unique terms. The destination identifier may be a first destination identifier. The library may be a first library. The machine readable memory may include a second destination identifier and a second library that includes second unique terms that correspond to a second organizational entity. The first and second libraries may be members of a plurality of libraries that correspond to different organizational entities.

The processor device may be configured to define: a plurality of clusters based on a union of the libraries; and, if: (1) the first unique terms and the second unique terms are both closer to one of the clusters than all of the other clusters; and (2) the first organizational entity is a sub-entity of the second organizational entity, a proxy destination that includes the first organizational sub-entity and the second organizational sub-entity. The proxy destination may be electronically embodied by an email address, a drop box, a physical mail box or any other suitable electronic or physical instrument.

The clusters may include k-means clusters, fuzzy clusters or any other suitable clusters. The clusters may be defined by their means, for example, by Equation 4.

$$\widetilde{DC} = \min(\Sigma_{i=1}^{M} \Sigma_{v_j \in DC_i} \|v_j - \overline{DC_i}\|^2) \qquad \text{Eqn. 4}$$

M is a number of destination clusters $DC_i$ into which the N library vectors are divided. When M=N, and the libraries are sufficiently different from each other, each library corresponds to its own cluster. When M<N and M is decreasing, similar libraries begin to merge into each other.

$v_j$ are vector offsets that correspond to each of the N library vectors. The offsets may be defined in any suitable manner. The $v_j$ may then be assigned to the nearest $DC_i$ by known cluster assignment and mean-updating methods. When cluster assignment does not converge (or does not converge rapidly enough), the length, and therefore the information content, of the library vectors may be increased to provide more distinction between them.

$\overline{DC_i}$ are the mean destination cluster vectors. $\|v_j - \overline{DC_i}\|$ is the norm or distance between the jth library vector and the mean vector of the ith destination cluster. $\widetilde{DC}$ is a vector of means of the destination clusters that are defined by the minimization in Equation 4. Computation of the $\overline{DC_i}$ and assignment of library vectors to the individual clusters may be accomplished by known methods.

The processor may be configured to select the destination for the mail item or mail item part by finding for the mail item or mail item part the cluster closest to the string vector obtained from the mail item or mail item part. The clusters thus model the set of destination libraries, but provide additional decision points when libraries are too close for distinction from each other. The additional decision points may be proxy destinations that trap mail items or mail item parts that would otherwise be routed to a destination that is not easily distinguished from another destination. The mail item or mail item part may at the proxy destination be subject to further analysis, such as by human intervention. Two or more entities that correspond to the proxy destination may be provided with access to the proxy destination for receipt of the mail item or mail item part. The two or more entities may have mail-sharing tools to account for acquisition of the mail item or mail item part by one of the entities and for exchange of the mail item or mail item part between the two or more entities.

When two or more libraries that are related as entity and sub-entity on the organizational chart merge into a cluster, the cluster may be defined as a proxy destination. Because the library vectors of the two or more libraries are so similar to each other, the mail item or mail item party may be routed to the proxy destination for further processing to avoid routing error that is caused by insufficient distinction between the libraries.

The processor may be configured to identify in the first unique terms a name that corresponds to the first organizational entity. The processor may be configured to route the mail item part to the first organizational entity instead of the proxy destination. This may allow the processor to override a cluster-based routing decision based on an identification of an entity or individual name.

The machine readable memory may include a second unique destination identifier and a second library that includes second unique terms that correspond to a second organizational entity. The first and second libraries may be members of a plurality of libraries corresponding to different organizational entities. The processor device may be configured to define a plurality of clusters based on a union of the libraries.

The processor device may be configured to define, if: (1) the first unique terms and the second unique terms are both closer to one of the clusters than all of the other clusters; and (2) the first organizational entity is not a sub-entity of the second organizational entity, a third organizational entity that includes both the first organizational entity and the second organizational entity, the third organizational being a proxy destination for the first organizational sub-entity and the second organizational sub-entity. This may provide a destination to which to route the mail item or mail item part when two or more libraries are difficult to distinguish from each other and correspond to entities that are on separate branches of the organizational chart.

The apparatus may include apparatus for routing mail items to different destinations. The apparatus may include a driven mail conveyor. The conveyor may include a belt conveyor, a roller conveyor, a hydraulic conveyor or any other suitable conveyor. The conveyor may be configured to receive a first mail item that includes a paper envelope displaying in an addressee segment an institution name and institution address information. The first mail item may include a first part. The conveyor may be configured to receive a second mail item that includes a paper envelope displaying in the addressee segment the institution name and the institution address information and no other institution address information. The second mail item may include a second part.

The processor may be configured to register in an electronic log the mail item. The processor may be configured to register in the electronic log the mail item part. Registration of the mail item or the mail item part may include providing in a routing record a serial number. The serial number may include a date. The serial number may be a number that is assigned to the mail item. The serial number may be a number that is assigned to the mail item part.

The processor may be configured to: electronically route, based on a first text string vector of the first part, the first mail item to a first mail item destination in the institution; and electronically route, based on a second text string vector of the second part, the second mail item to a second mail item destination in the institution, the second mail item destination being different from the first mail item destination.

The apparatus processor may be configured to quantify a first closeness between the first text string vector and a first library vector that corresponds to the first mail item destination; and a second closeness between the second text string vector and a second library vector that corresponds to a second mail item destination. The processor may be configured to select the first destination based on the first closeness; and the second destination based on the second closeness.

To electronically route the first mail item, the processor may be configured to: tally a first number of matches between the first string vector and the first library; tally a third number of matches between the first string vector and a third library that corresponds to a third mail item destination; score the first number to determine a first score; score the third number to determine a third score; and select that of the first and third destinations that corresponds to a higher one of the first and third scores.

To electronically route the second mail item, the processor may be configured to: tally a second number of matches between the second string vector and the second library; tally a fourth number of matches between the second string vector and a fourth library that corresponds to a fourth mail item destination; score the second number to determine a second score for the second library; score the fourth number to determine a fourth score for the fourth library; and select that of the second and fourth destinations that corresponds to a higher one of the second and fourth scores. The scoring may be calculated based on Equation 2.

To score the first number, the processor may be configured to identify the number of text strings in the first library; identify the number of text strings in the first string vector; and calculate the multiplicative product of the first number and the reciprocal of (the number of text strings in the first library X the number of text strings in the first string vector) to arrive at the first score.

To score the third number, the processor may be configured to: identify the number of text strings in the third library; identify the number of text strings in the third string vector; and calculate the multiplicative product of the third number and the reciprocal of (the number of text strings in the third library X the number of text strings in the third string vector) to arrive at a the third score.

When the first and third libraries are members of a plurality of N libraries, the processor may be configured to calculate: a sum of the scores of the N libraries; a first probability for the first mail item destination that is equal to about the first library score divided by the sum; and a third probability for the third mail item destination that is equal to about the third library score divided by the sum. The probabilities may be expressed as fractions that range from 0 to 1.

The processor may be configured to route the mail item to the first destination only if the first probability is a least 0.5 greater than the third probability. That is, the processor will so route the mail item only if the first probability P1 is greater than or equal to P3+0.5.

The processor may be configured to route the mail item to the first destination only if the first probability is a least 0.5 times greater than the third probability. That is, the processor will so route the mail item only if the first probability P1 is greater than or equal to 5×P3.

The apparatus may include apparatus for routing the mail item part.

The receiver device may be configured to electronically receive: an indication that a first mail item part of the mail item is a check; an indication that a second mail item part of the mail item is a payment coupon; and an indication that a third mail item part of the mail item is a message.

The processor device may be configured to: route the first mail item part and the second mail item part to a first destination; and route the third mail item part to a second destination that corresponds to terms in the message.

The apparatus may include a reflection detector that is in communication with the receiver. The reflection detector may be configured to measure: a dimension of the first mail item part, the dimension being a first dimension; a dimension of the second mail item part, the dimension being a second dimension; and a dimension of the third mail item part, the dimension being a third dimension.

The reflection detector may include a laser source. The reflection detector may include an angulating beam deflector. The beam deflector may be a mirror. The reflection detector may include a beam intensity sensor. The beam intensity sensor may be collocated with the deflector. The reflection detector may include a back plate. The back plate may have a known reflectivity. The mail item may include a packaging material. The material may include paper. The material may include cardboard. The material may include cotton. The material may include fiber. The material may include recycled material.

The mail item may include an overlap. For example, the mail item may include an envelope that includes a closure that overlaps a face of the mail item. The envelope may be a mail item part. The mail item may include a first panel that overlaps a second panel.

The beam may be trained on the mail item part. The beam may be traversed across the mail item part. The beam may form a reflective dot on the mail item part. The processor may use the angle of the beam and the distance between the deflector and the mail item part to calculate the position of the dot relative to a corner of the mail item part. The corner of the envelope may be a reference corner. The detector may detect a first reflected intensity when the dot is on an interior region of a panel. The detector may detect a second reflected intensity when the dot intersects with the overlap. The detector may detect a third reflected intensity when the dot intersects with an edge of the mail item part. The first, second and third intensities may be recorded as fractional intensities relative to the back plate.

The dot may be traversed along the face of the mail item part along a preprogrammed path. The path may be rectilinear. The path may be sinusoidal. The path may have any suitable pattern. The first, second and third intensities may be used to detect the one or more of the first, second and third dimensions. The first, second and third intensities may be used to detect locations of the edges of the mail item part, the locations of the overlaps and any other suitable physical parameters of the mail item part. The physical parameters may be used to calculate a mail item part width, length and thickness. The physical parameters may be used to estimate an envelope type. The envelope type may be based on a fold pattern. Fold patterns may be labeled (e.g., "A," "B," "C," . . . ) using any suitable catalog of known fold patterns.

The physical parameters may be used to estimate a document type. The envelope type may be based on a fold pattern.

The processor may be configured to classify: based in part on the first dimension, the first mail item part as the check; based in part on the second dimension, the second mail item part as the payment coupon; and, based in part on the third dimension, the third mail item part as the message.

The processor may be configured to classify the first mail item part by determining a first score indicating closeness of fit between a first string vector from the first mail item part and a first destination string vector.

The processor may be configured to classify the second mail item part by determining a second score indicating closeness of fit between a second string vector from the second mail item part and a second destination string vector.

The processor may be configured to classify the third mail item part by determining a third score indicating closeness of fit between a third string vector from the third mail item part and a third destination string vector.

The processor may be configured to: identify in an output vector of an electronic classification network the first destination; and, to classify the first mail item part, apply the electronic classification network to an input vector that includes: the first dimension; and a string vector from the first mail item part.

The classification network may be an artificial neural network. The artificial neural network may be implemented on a computational platform such as the Neural Network Toolbox, which is available under the trademark MATH-WORKS from The Mathworks, Inc., Natick, Mass.

The input vector may be an input layer for the classification network. The output vector may be an output layer for the classification network. The classification network may include one or more hidden layers between the input layer and the output layer. Each hidden layer may be a vector that includes one or more hidden layer cells. The hidden layer cells may sum weighted input from the input layer (or from a preceding hidden layer). The hidden layer may apply an activation function to the summed weighted input. The activation function may be a sigmoidal or hyperbolic tangent function, but a signum or Heavyside function may be used.

The classification network may be trained in a supervised fashion, for example, using the scaled conjugate gradient approach, to classify input vectors as belonging to a category. For example, the classification network may be a document classification network that is trained to classify input vectors as belonging to a document type, such as check, a payment coupon, an invoice, a letter or any other type of document. A document classification training data set may be used to train the document classification network.

The document training classification training data set may include an input data array based on sample documents of different types. The input data array may have a column for each of the sample documents and a row for each of one or more of the physical parameters and one or more of the information parameters. The document classification training data set may include an output array that indicates for each of the sample documents the correct known document type. The output array may have a column corresponding to each document and a row for each possible document type. The correct document type for each sample document may be indicated by the presence, in the column for the sample document, of a "1" in the row corresponding to the correct document type. The classification network may be applied serially to the sample documents. Input or embedded layer weights may be adjusted based on differences or gradients between the empirical output for the document and the correct output for the document until the classification network sufficiently correctly predicts document types for the sample documents. The classification network may then be applied to documents whose type is unknown.

The classification network may be retrained using different physical and information parameters to improve accuracy.

The classification network may be trained in a supervised fashion, for example, using the scaled conjugate gradient approach, to classify input vectors as corresponding to a destination. For example, the classification network may be a document classification network that is trained to classify input vectors as corresponding to one of entities 1400 (shown in FIG. 14), one of clusters 1600 (shown in FIG. 16), one of clusters 1700 (shown in FIG. 17), one of clusters 1800 (shown in FIG. 18) or any other suitable destination.

A destination classification training data set may be used to train the document classification network.

The destination training classification data set may include an input data array based on sample mail item parts. The input data array may have a column for each of the sample mail item parts and a row for each of one or more of the physical parameters and one or more of the information parameters. The destination classification training data set may include an output array that indicates for each of the sample mail item parts the correct known destination. The output array may have a column corresponding to each mail item part and a row for each possible destination. The correct destination for each sample document may be indicated by the presence, in the column for the sample document, of a "1" in the row corresponding to the correct destination. The classification network may be applied serially to the sample mail item parts. Input or embedded layer weights may be adjusted based on differences or gradients between the empirical output for the mail item part and the correct output for the mail item part until the classification network sufficiently correctly predicts destinations for the sample mail item parts. The classification network may then be applied to mail item parts whose destination is unknown.

The classification network may be retrained using different physical and information parameters to improve accuracy.

To classify a received mail item part, the input vector may include one or more of the physical parameters. The one or more physical parameters may be from a single mail item part. The one or more physical parameters may be from one or more mail item parts in the mail item. The input vector may include one or more information parameters. The one or more information parameters may be from a single mail item part. The one or more information parameters may be from one or more mail item parts in the mail item. The one or more information parameters may be part or all of a string vector. The one or more information parameters may include some or all of more than one string vector.

The classification network may be trained to classify the input vector into a destination or a proxy destination. When the classification network is so trained, the input vector may include parameters from one or more parts of a mail item.

The classification network may be trained to classify the input vector into a document type. When the classification network is so trained, the input vector may include parameters from no more than one mail item part. When the classification network is so trained, the input vector may include parameters from no more than two mail item parts, one of which is an envelope and the other of which is a mail item part from inside the envelope.

The input vector may include a string. The string may be a text string. The text string may be from the envelope surface. When the input vector includes two or more strings, the two or more strings may be in the string vector. The string vector may include text from the mail item part.

The output vector may include a value for each of a plurality of the destinations. The value may indicate a match between the input vector and the destination. The value may indicate NOT a match between the input vector and the destination. The processor may provide to the routing record a destination identifier that identifies the destination that matches the input vector.

The destination may be a first destination. The output vector may be a first output vector. The input vector may be a first input vector. The processor may be configured to: identify in a second output vector of the electronic classification network the first destination. The processor may be configured, to classify the third mail item part, to apply the electronic classification network to a second input vector that includes: the third dimension; and a string vector from the third mail item part.

The conveyor may be in mechanical communication with a mail item registration station. The processor may be disposed in the station. The processor may be disposed apart from the station. The processor may be in electronic communication with the station. The processor may be configured to register the first part of the mail item. The processor may be configured to determine that: the first part is a payment part; and a second part that corresponds to the first part is exceptional; identify a destination that corresponds to the first part; and route the first part to the destination along with an indication corresponding to the missing second part.

The processor may be configured to categorize the first part as exceptional because the first part: is not present in the mail item; or lacks a customer signature.

The processor may be configured to: apply an electronic classification network to an input vector that corresponds to the first part. The input vector may include: a physical parameter vector that corresponds to output from an optical probe of the first mail item part; and a string vector that includes a text segment from the first mail item part. The optical probe may include, or may be included in, the reflection detector.

The processor device may receive from the network an indication that the first mail item part corresponds to a member of a two-member check-coupon pair. A check-coupon pair may include a check drafted by a payor on an account in the custody of an institution that is different from the organization. The payor may be a customer of the organization. The check-coupon pair may include a payment coupon. The coupon may be prepared by the organization. The coupon may include customer information about the customer.

The coupon may include addressee information about the organization. The coupon may include a form code that includes mail item information. The mail item information may include account information about an account of the customer. The mail item information may include balance information. The mail item information may include minimum payment information. The mail item information may include symbolic information. For example, the mail item information may include shaped field information. The shaped field information may include a geometric shape. The geometric shape may be provided for the customer to enter payment amount information. The payment amount information may correspond to an amount on the check. The organization may initiate the check-coupon pair by providing the coupon to the customer. The customer may complete the check-coupon pair by placing the coupon in an envelope along with the check and transmitting the pair to the organization.

The processor may be configured to identify the destination by matching an account number on the first mail item to a customer account that is associated with the destination.

The processor may be configured to: apply the electronic classification network to an input vector that includes: a string vector that includes a text string from the first mail item part; and receive from the network an output vector indicating a match with the destination.

The apparatus may include a magnetic ink character recognition ("MICR") reader that is configured to obtain the text segment.

The processor may be configured to set the indication to correspond to the other member of the check-coupon pair.

The apparatus may include apparatus for applying a mailing label.

The apparatus may include the mail item receipt conveyor. The apparatus may include the mail registration station. The mail registration station may include a scanning device that is configured to capture information from an exterior surface of a mail item. The information may include a printed message indicating that a customer name appearing on the mail item does not correspond to an address on the mail item. The scanning device may be configured to capture a delivery error message segment of the surface. The processor device may be configured to identify an electronic mail address that corresponds to a customer name in the addressee segment of the surface.

The apparatus may include a transmitter device that is configured to transmit to the email address an electronic form for electronically receiving a different address.

The processor device may be configured to route the envelope from a mail item digitization process to a holding stage. The holding stage may include a bin for holding the mail item. The holding stage may be referred to as a mail item "orphanage" or a "dead letter office."

The apparatus may include a receiver device that is configured to receive the different address. The processor device may be configured to: apply to the envelope a mailing label including the different address; and route the envelope from the holding bin to the mail delivery service.

The processor device may be configured to, at the termination of a wait period during which the different address is not received: route the envelope back to the mail item digitization process; and route an electronic image of a part of the mail item to a destination corresponding to the part.

The processor may be configured to flag the electronic image as exceptional based on the printed message.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
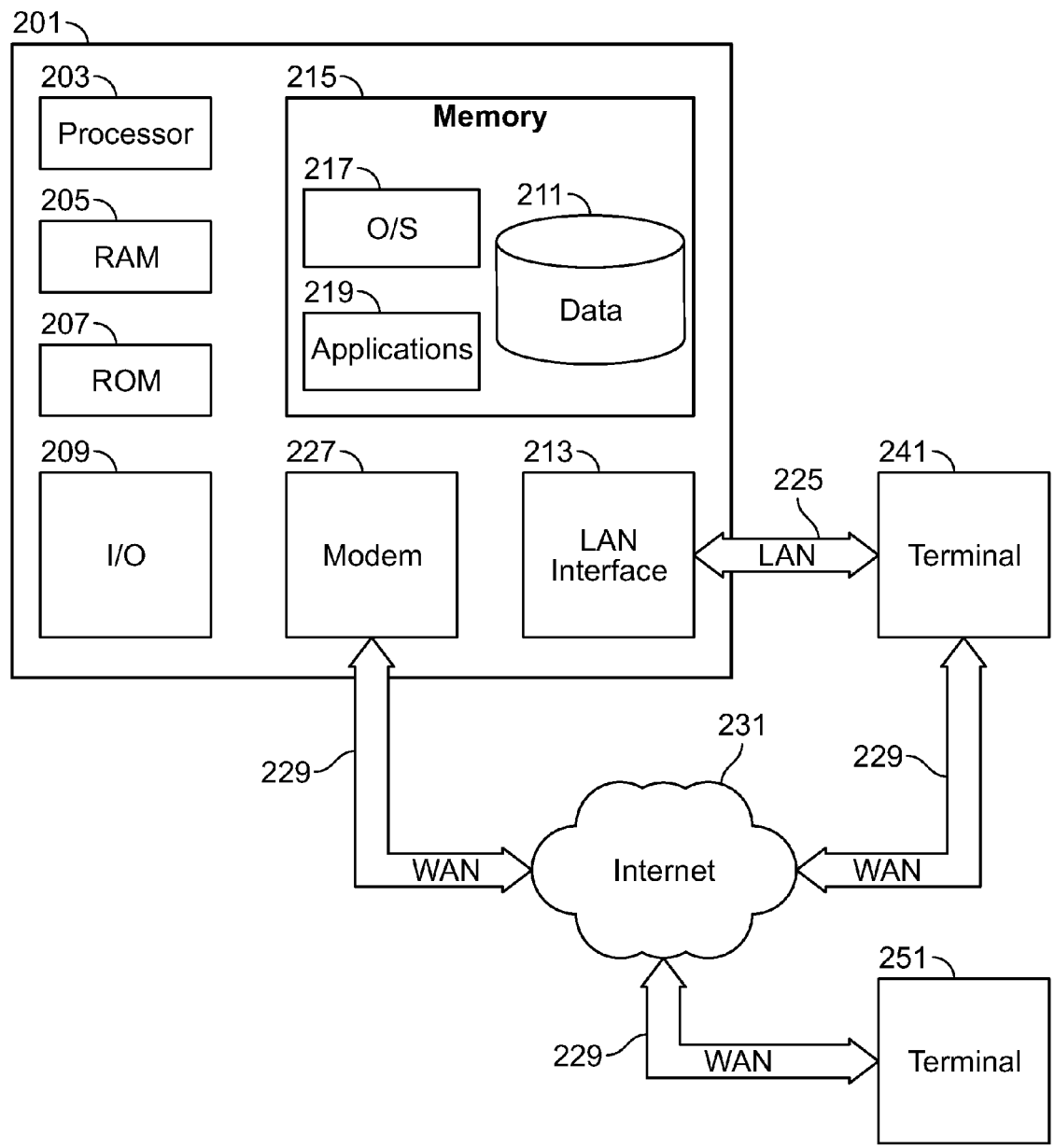
FIG. 2 shows illustrative apparatus that may be used in accordance with the principles of the invention.

Processes in accordance with the principles of the invention may include one or more features of the processes illustrated in the FIGS. For the sake of illustration, the steps of the illustrated processes will be described as being performed by a "system." The "system" may include one or more of the features of the apparatus that are shown in FIGS. 1-2 and/or any other suitable device or approach. The "system" may be provided by the organization, another party or any other suitable party.

FIG. 1 shows illustrative apparatus 100 for routing mail item M to an entity in an organization O (not shown). Receiving dock 102 may receive mail item M. Mail item M may be addressed on its exterior to organization O. Mail item M may not include information identifying an addressee entity within organization O. Receiving dock 102 may receive mail item M as one of a plurality of mail items. Each of the plurality of mail items may be addressed on its exterior to organization O. Each may not include information identifying an addressee entity within organization O. Each of the plurality may originate from a sending party. The sending party may send the mail item from outside the organization. The sending party may be independent from the organization. The sending party may send the mail item from within the organization. The sending party may act as an agent of the organization to send the mail item to the organization.

Mail item M may be transported to conveyor/sorter 104. Conveyor/sorter 104 may size-sort and align mail item M for individual analysis.

Mail item M may be transported to reflection detector 106. Reflection detector 106 may register mail item with a serial number. Reflection detector 106 may open an electronic routing record for mail item M. Reflection detector 106 may insert the serial number in the routing record. Reflection detector 106 may detect physical parameters of mail item M.

Mail item M may be transported to image grabber 108. Image grabber 108 may capture an image of a front surface of mail item M. Image grabber 108 may capture an image of a rear surface of mail item M. Image grabber 108 may capture an image of a lateral surface of mail item M. Image grabber 108 may capture an image in the visible portion of the electromagnetic spectrum. Image grabber 108 may capture an image in the near infrared portion of the electromagnetic spectrum. An infrared image may identify the presence of non-paper materials in the mail item. The infrared image may identify the presence of water in the surface of the mail item. Image grabber 108 may capture an image in the ultraviolet portion of the electromagnetic spectrum. The ultraviolet image may identify information that is not visible by the naked eye. The information may be embodied in patterns, symbols, characters or other subject matter on the surfaces of mail item M. Image grabber 108 may attach the image to the routing record.

Mail item M may be transported to opener 110. Opener 110 may open mail item M and remove from mail item M one or more mail item parts PM. If mail item M includes an envelope, the envelope may be included as a mail item part in PM.

Mail item parts such as mail item part $P_{mi}$ (not shown) may be transported to reflection detector 112. Reflection detector 112 may count the number of mail item parts that are present in mail item M. Reflection detector 112 may detect physical parameters of mail item part $P_{mi}$. The number of mail item parts may be included in the physical parameters. Reflection detector 112 may have one or more features in common with reflection detector 106. Reflection detector 112 may be reflection detector 106. Reflection detector 112 may attach some or all of the physical parameters to the routing record. Reflection detector 112 may assign a serial number to each of the mail item parts. Reflection detector 112 may attach the serial number to the routing record.

Mail item part $P_{mi}$ may be transported to image grabber 114. Image grabber 114 may capture an image of a front surface of mail item part $P_{mi}$. Image grabber 114 may capture an image of a rear surface of mail item part $P_{mi}$. Image grabber 114 may capture an image of a lateral surface of mail item part $P_{mi}$. Image grabber 114 may have one or more features in common with image grabber 108. Image grabber 114 may be image grabber 108. Image grabber 114 may attach the image to the routing record.

Mail item parts PM may be transported to holding stage 116. Holding stage 116 may hold the physical mail item parts.

Segment processor 116 may decompose segments of the images into text, symbols or patterns. Segment processor 116 may include processor devices for recognizing characters, symbols and patterns in the segments. Segment processor 116 may attach some or all of the segments to the routing record. Segment processor 116 may derive one or more text strings from the segments. Segment processor 116 may attach one or more the text strings to the routing record.

Segment processor 116 may pass control of the routing record to routing engine 118. Routing engine 118 may apply one or more tests to the routing record to identify a destination in the organization to which to route part or all of the routing record. The destination may correspond to an entity in organization map database 120.

Routing engine 118 may pass control of the routing record to electronic mail server 122. Electronic mail server 122 may transmit some or all of the routing record to the destination. For example, electronic mail server 122 may transmit the routing record to one or more of destinations D1, D2, . . . , DD via electronic communication network 124. Electronic mail server 122 may receive an electronic mail item electronically from electronic communication network 124. Routing engine 118 may provide a routing record for the electronic mail item. Routing engine 118 may account for one or more electronic mail item parts, such as attachments, in the electronic mail item.

Electronic mail server 122 may transmit the electronic mail item to segment processor 116 for derivation of text strings. The electronic mail item routing record may be routed by routing engine 118 in the same or a similar manner as routing engine 118 routes a routing record for non-electronic mail items.

FIG. 2 is a block diagram that shows illustrative computing device 201, which may be specifically configured as a component in one or more of the devices shown in FIG. 1. For example, a computing device such as 201 may be present in one or more of conveyor/sorter 104, reflection detector 106, image grabber 108, opener 110, reflection detector 112, image grabber 114, holding stage 116, segment processor 116, routing engine 118, organization chart database 120, electronic mail server 122 and electronic communication network 124.

Computing device 201 may be included in any suitable apparatus that is shown or described herein. Computing device 201 may have a processor 203 for controlling overall operation of the server and its associated components, including RAM 205, ROM 207, input/output module 209, and memory 225.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 225 and/or storage to provide instructions to processor 203 for enabling computing device 201 to perform various functions. For example, memory 225 may store software used by computing device 201, such as an operating system 217, application programs 219, and an associated database 221. Alternatively, some or all of computing device 201 computer executable instructions may be embodied in hardware or firmware (not shown).

Computing device 201 may operate in a networked environment supporting connections to one or more remote computers, such as terminals 241 and 251. Terminals 241 and 251 may be personal computers or servers that include many or all of the elements described above relative to computing device 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 223. When used in a WAN networking environment, computing device 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by computing device 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, cell phone, Blackberry™, or any other suitable device for storing, transmitting and/or transporting relevant information.

Any information described above in connection with database 221, and any other suitable information, may be stored in memory 225.

One or more of applications 219 may include one or more algorithms that may be used to process invoice data, assemble billing event record data sets, correlate billing events and billing event descriptors, analyze billing events, report billing event analysis, and/or perform any other suitable tasks related to processing invoice data.

The invention may be operational with numerous other general purpose or special purpose computing system environments or configurations. Examples of well known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
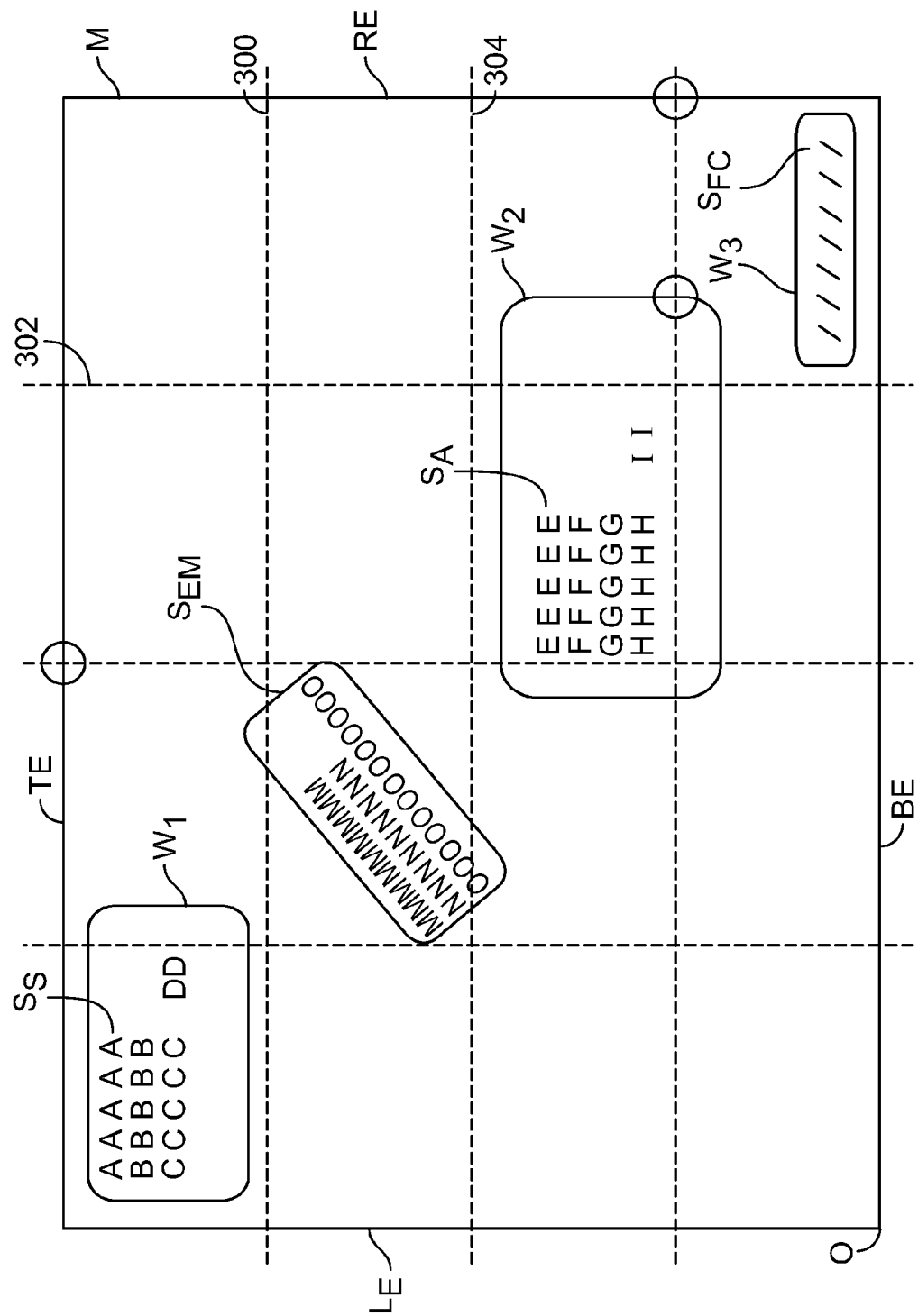
FIG. 3 shows an illustrative work piece that may be processed in accordance with the principles of the invention.

FIG. 3 shows illustrative path 300, in broken line, across a front surface of mail item M. The reflection detector may guide the optical dot along path 300. Reflection from the dot may provide a basis for one or more of the physical parameters identified in Table 1.

Mail item M may include top edge TE, left edge LE, right edge RE, bottom edge BE and origin corner O. Mail item M may include information windows. The information windows may include boundaries that have relief perpendicular to the plane of FIG. 3. Mail item M may include information window W1. Mail item M may include information window W2. Mail item M may include information window W3.

Window W1 may encompass sender address segment Ss. Window W2 may encompass addressee address segment SA. Window W3 may encompass form code segment SFC.

Mail item M may include error message segment SEM. Segment SEM may include an error message, such as "ADDRESSEE UNKNOWN" or "RETURN TO SENDER." The error message may be printed on the surface of mail item M. The segments may be decomposed into text. The text may be used to identify the mail item document type. The text may be used to identify the destination. The segments may be processed in a manner that is similar to that discussed below in connection with check 500.

Path 300 may include vertical sections 302. Path 300 may include horizontal sections 304. Path 300 may cross textural features T, in item M exterior, at points such as T1, at the top edge of mail item M, T2, at the right side edge of mail item M, and T3, at a right boundary of window W2. Path 300 may be varied to increase or decrease the areal sampling density. The reflection detector may use reflections such as those from points T1, T2 and T3 to record physical parameters of mail item M.

Figure 4:
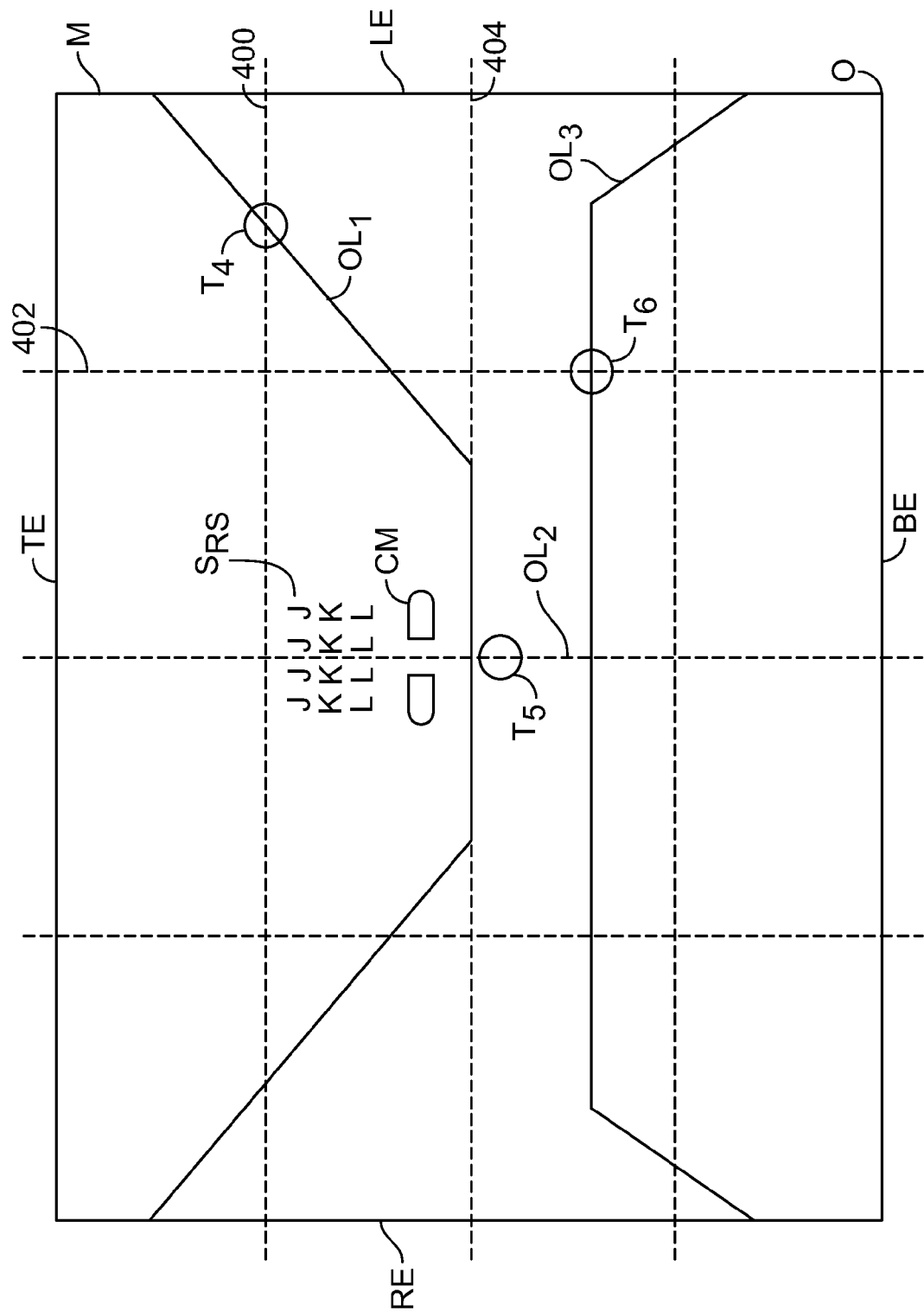
FIG. 4 shows a different view of the work piece of FIG. 3.

FIG. 4 shows illustrative path 400, in broken line, across back surface of mail item M. The reflection detector may guide the optical dot along path 400. Mail item M may include top edge TE, left edge LE, right edge RE, bottom edge BE and origin corner O. Mail item M may include overlaps. The overlaps may have relief perpendicular to the plane of FIG. 4. Mail item M may include overlap OL1. Mail item M may include overlap OL2. Mail item M may include overlap OL3.

Path 400 may include vertical sections 402. Path 400 may include horizontal sections 304. Path 300 may cross textural features T, in item M exterior, at points such as T4, at overlap OL1, T5, at overlap OL2, and T6, at overlap OL3. Path 400 may be varied to increase or decrease the areal sampling density. The reflection detector may use reflections such as those from points T4, T5 and T6 to record physical parameters of mail item M. The reflections may be used to identify specific classes of envelopes based on the locations of points such as T4, T5 and T6.

Mail item M may include return sender address segment SRS. The segment may be decomposed into text. The text may be used to identify the mail item document type. The text may be used to identify the destination. The segments may be processed in a manner that is similar to that discussed below in connection with check 500.

Mail item M may include closure mechanism CM, whose presence may be a physical parameter.

FIGS. 5-10 illustrate the decomposition of segments into text strings. The text strings may be included in a string vector. A check is used to illustrate the mail item part. It will be understood, though that the mail item part may be a check, a payment coupon, a letter, an envelope or any other type of mail item part.

Figure 5:
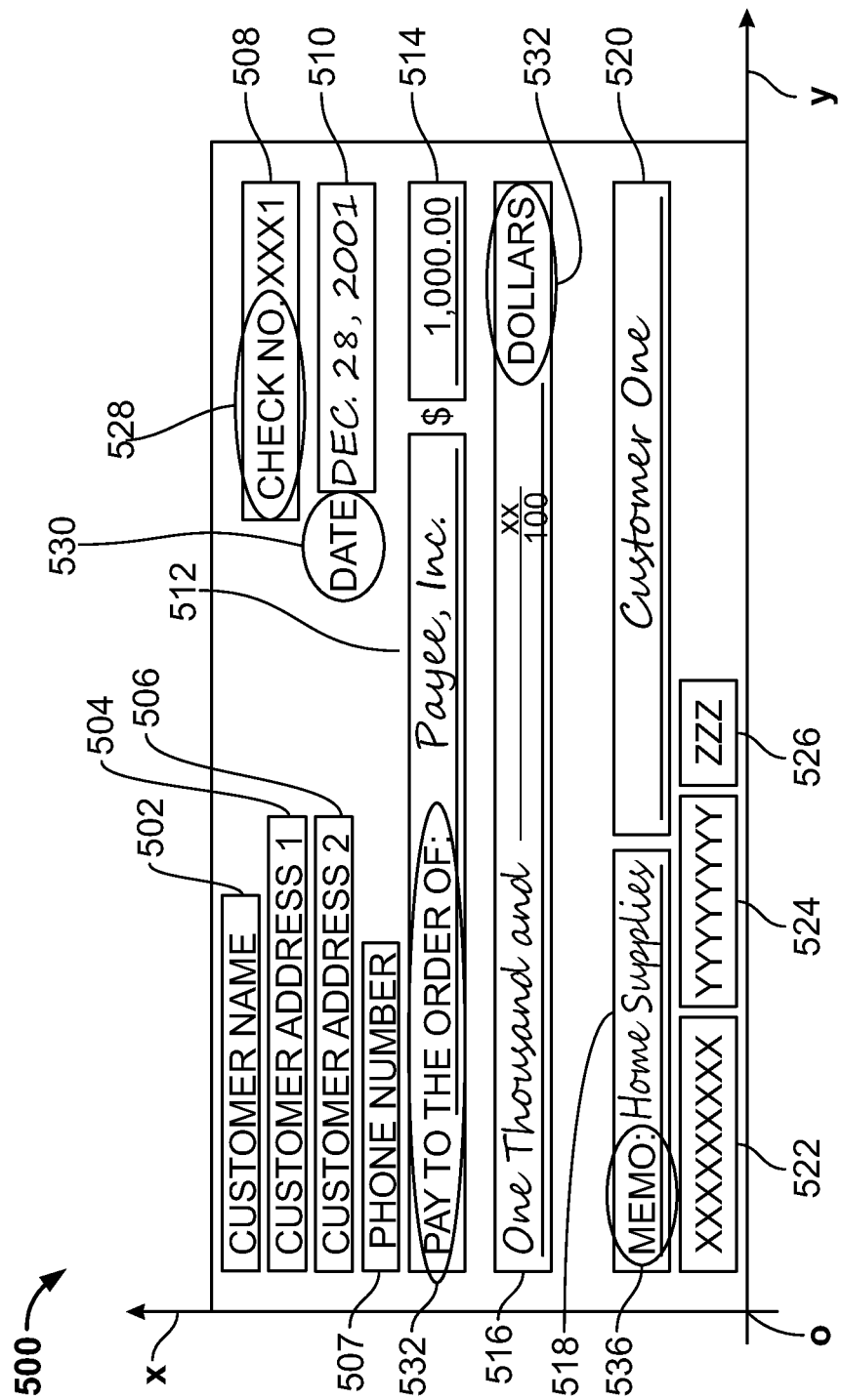
FIG. 5 shows another illustrative work piece that may be processed in accordance with the principles of the invention.

FIG. 5 shows illustrative front check image 500. Check image 500 may include one or more segments. Each segment may correspond to information that is included on the front of a check. In FIG. 5, check segments are identified by rectangular boxes. The check segments may be identified using any suitable text or pattern recognition approach. For example, check image 500 may include one or more of customer name segment 502, customer address 1 segment 504, customer address 2 segment 506, check number segment 508, date segment 510, payee segment 512, amount segment 514, dollars segment 516, comment segment 518, signature segment 520, routing number segment 522, account number segment 524, check number segment 526 and any other suitable segments.

Check image 500 may include one or more form field identifiers. Each form field identifier may correspond to a type of information that is displayed on the check to identify a check segment. For example, check image 500 may include one or more of "check number" form field identifier 528, "date" form field identifier 530, "pay-to-the-order-of" form field identifier 532, "dollars" form field identifier 534, "memo" form field identifier 536 and any other suitable form field identifiers.

Origin "O" may be identified as a location on check image 500 from which to quantify the relative locations of the segments. For example, origin O may be coincident with the lower left corner of a check upon which check image 500 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes. For example, the location of a rectangular segment may be quantified as the coordinates of four corners of a rectangle. Any other suitable scheme for quantifying segment locations may be used.

Figure 6:
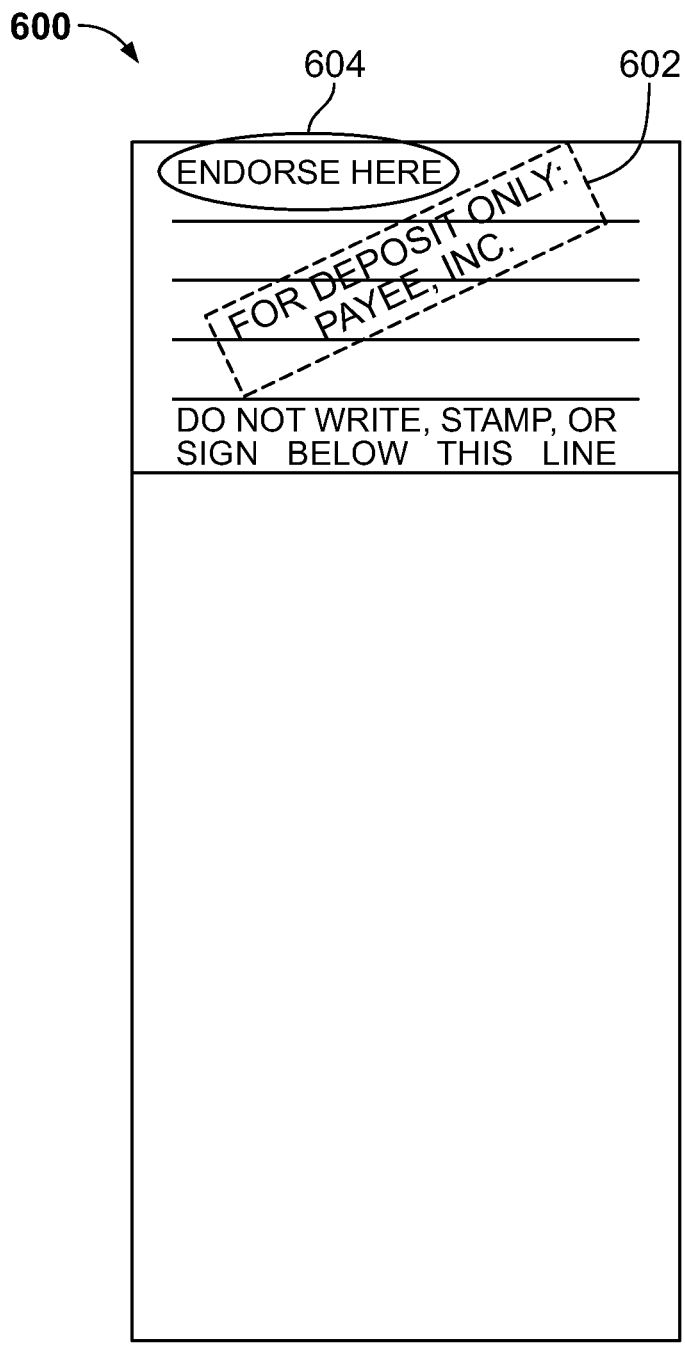
FIG. 6 shows a different view of the work piece of FIG. 5.

FIG. 6 shows illustrative back check image 600. Back check image 600 may include one or more segments. Each segment may correspond to a type of information that is included on the back of a check. In FIG. 6, check segments are identified by rectangular boxes. For example, back check image 600 may include payee endorsement segment 602 and any other suitable segments.

Back check image 600 may include one or more form field identifiers. Each form field identifier may correspond to a type of information that is displayed on the check to identify a check segment. For example, check image 600 may include "endorse-here" form field identifier 604 and any other suitable form field identifiers.

Table 3 shows illustrative check segments and illustrative corresponding form field identifiers.

TABLE 3

Illustrative check segments and illustrative corresponding form field identifiers.

| Illustrative corresponding check segments | Illustrative corresponding form field identifiers |
|---|---|
| Check number segment (508) | |
| Check number segment (526) | |
| Customer name segment (502) | |
| Customer address 1 segment (504) | |
| Customer address 2 segment (506) | |
| Routing number segment (522) | |
| Account number segment (524) | |
| Payee segment (512) | PAY TO THE ORDER OF (532) |
| Payee endorsement segment (602) | ENDORSE HERE (604) |
| Payee segment (512) | PAY TO THE ORDER OF (532) |
| Date segment (510) | DATE (530) |
| Amount segment (514) | |
| Dollars segment (516) | DOLLARS (534) |
| Comment segment (518) | MEMO (536) |
| Comment segment (518) | MEMO (536) |
| Signature segment (520) | |

Figure 7:
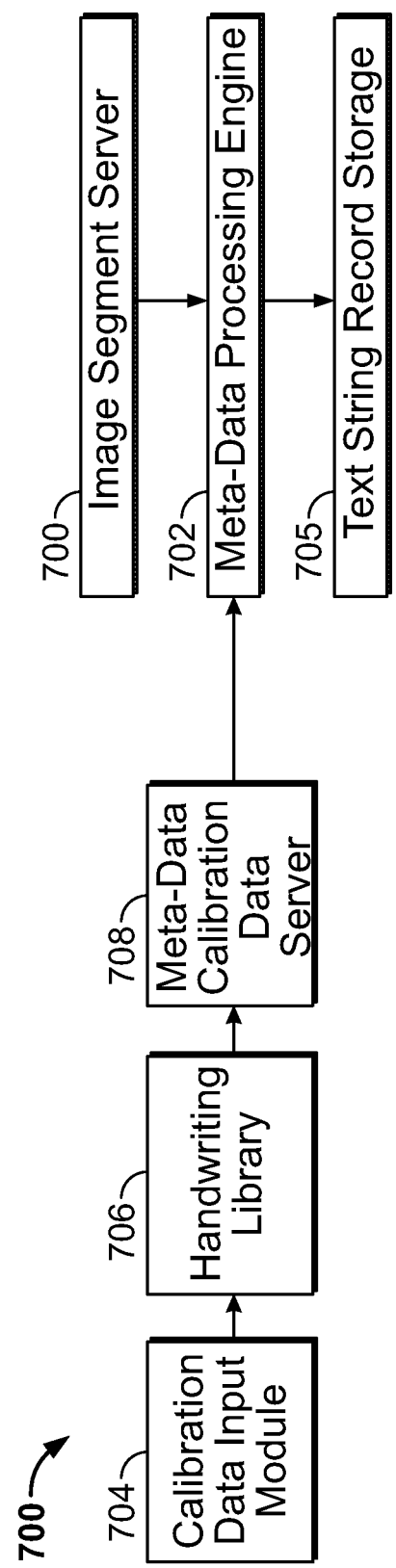
FIG. 7 shows illustrative elements of a process in accordance with the principles of the invention.

FIG. 7 shows illustrative arrangement 700 for deriving a text string based on handwritten content that may be present in a segment. For example, handwritten content may be present in a check memo segment. Handwritten content may be present in a segment of a letter. Handwritten content may be present in a payment amount segment of a payment coupon. Handwritten content may be present on any type of document. For example, an organization employee or agent may receive the mail item or mail part, write on it, and present it to the processor for rerouting within the organization. Handwritten content may be present in any other suitable mail item or mail item part.

One or more of the elements of arrangement 700 may include one or more of the features shown in FIG. 5. Arrangement 700 may include meta-data processing engine 702. Meta-data processing engine 702 may receive a check image, such as front check image 500 (shown in FIG. 5) or back check image 600 (shown in FIG. 6), from check image server.

Arrangement 700 may include calibration data input module 704. Calibration data input module 704 may receive from a handwriting sample. The handwriting sample may be from a customer of the organization. The handwriting sample may be from an employee of the organization.

The handwriting sample may correspond to printed character reference text. The customer may provide the printed character reference text. Meta-data processing engine 702 may provide the printed character reference text. The printed character reference text may be derived from printed character text on the check.

Handwriting may include cursive or script information written by hand or printed by machine. Printed character text may be block-style letters that are written by hand or printed by machine.

The handwriting sample may be a signature. The signature may be from a signature card that the customer signed to obtain signatory authority for an account. The printed character reference text may be prepared in connection with the signature.

The handwriting sample may be from a check image such as front check image 500 (shown in FIG. 5) or back check image 600 (shown in FIG. 6) or from any other type of mail item part. The corresponding printed character reference text may be provided by a handwriting decoding algorithm, a financial institution agent, the customer or any other suitable system or individual.

The corresponding printed character reference text may be obtained from a check image such as front check image 500 (shown in FIG. 5) or back check image 600 (shown in FIG. 6). For example, the printed character reference text may be obtained from segment 602 of check image 600. Some or all of the content of segment 602 may correspond to some or all of the content of segment 512 of check image 500. When the document is a payment coupon, the printed character reference text may be obtained, for example, from a minimum payment amount numerical field.

Handwriting library 706 may store the handwriting samples and the corresponding printed character reference text. Handwriting library 706 may store handwriting samples and corresponding printed character reference text for a plurality of accounts. Handwriting library 706 may store, in connection with one or more of the handwriting samples, a numerical function or functions that quantitatively characterize the handwriting sample. Handwriting library 706 may store handwriting samples and corresponding printed character reference text for a plurality of organization correspondents. One or more of the correspondents may be an organization customer.

A handwriting sample may be collected from the organization customer upon opening of an account. The handwriting sample may include a phrase. The phrase may be a letter. The phrase may be word. The phrase may be a sequence of words. The phrase may be a sentence. The phrase may be any suitable unit of writing. The phrase may include letters that are known to the institution. The institution may store the phrase as a reference phrase. The institution may provide the phrase to the customer. The customer may copy the phrase in cursive handwriting. The customer may copy the phrase in printed handwriting. The handwriting sample may include all capital letters. The handwriting sample may include all lower case letters. The handwriting sample may include both upper case and lower case letters. The handwriting sample may be paired in the library with reference phrase. The reference phrase may be used to associate some or all of the handwriting sample with the known letters.

The institution may provide the customer with an opportunity to enroll in a handwriting translation program. The program may involve some or all of the features of arrangement 700. The institution may provide the customer with an opportunity to open an account that involves some or all of the features of arrangement 700. The institution may provide the customer with an opportunity to provide a handwriting sample at the time of enrollment in the program or at the time of opening the account. The institution may provide the customer with an opportunity to provide a handwriting sample at any suitable time. For example, the institution may provide a web site that includes one or more reference phrases and instructs the customer how to provide the handwriting sample. The customer may provide the handwriting sample by writing the phrase on paper and scanning and transmitting the handwriting sample to the institution. The customer may provide the handwriting sample via stylus and tablet such that the handwriting sample is directly electronically transmitted to the institution via a customer device. The customer may provide the handwriting sample to the institution at a brick-and-mortar financial services center.

Meta-data calibration data server 708 may serve handwriting samples to meta-data processing engine 702. Meta-data calibration data server 708 may serve printed character reference text that corresponds to the handwriting samples to meta-data processing engine 702.

Meta-data calibration data server 708 may include a processor (not shown) that compares segment content to a library handwriting sample. For example, the processor may receive segment content from meta-data processing engine 702. The processor may generate one or more numerical functions that correspond to the check segment content. The processor may quantitatively compare the one or more check segment content numerical functions to the one or more handwriting sample numerical functions. The processor may thus identify a handwriting sample that matches or partially matches the segment content. The match or partial match may be based on an objective function that indicates a degree of likeness between the handwriting sample and the segment content.

If a match or partial match is found, meta-data calibration data server 708 may provide to meta-data processing engine 702 the printed character reference text that corresponds to the handwriting sample.

Arrangement 700 may include text string storage 705. Information parameter storage 705 may include one or more records of information parameters from the mail item part.

Figure 8:
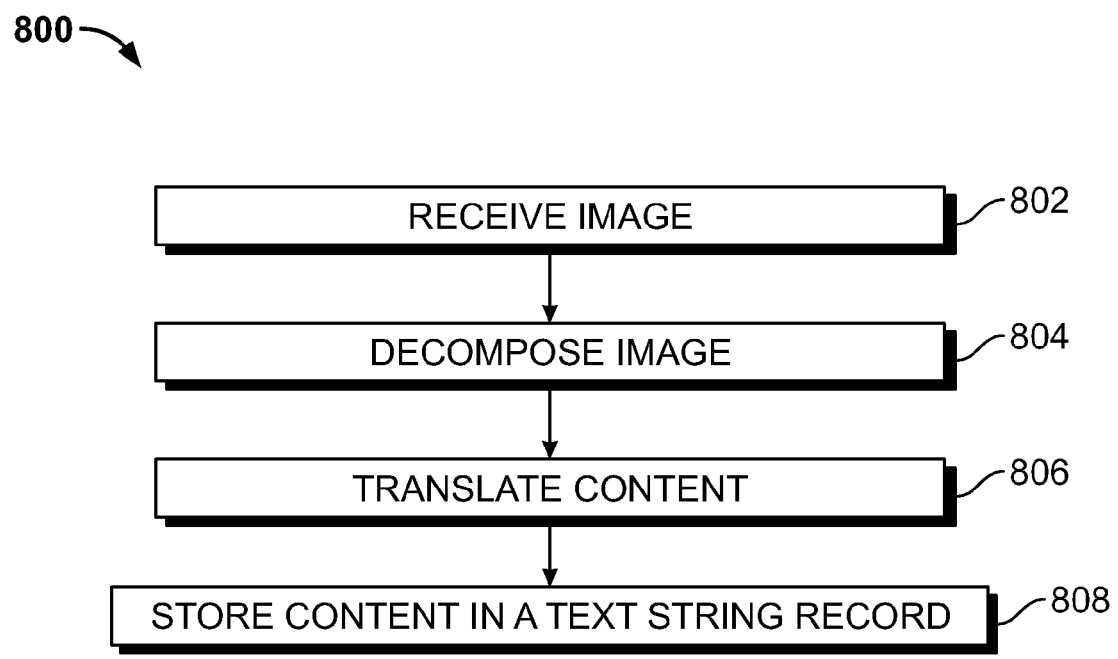
FIG. 8 shows illustrative elements of another process in accordance with the principles of the invention.

FIG. 8 shows illustrative process 800 for identifying a text string. Process 800 may begin at step 802. At step 802, the system may receive an image. At step 804, the system may decompose the image to isolate a segment. At step 806, the system may translate content of the segment. At step 808, the system may store translated content in a text string record.

Figure 9:
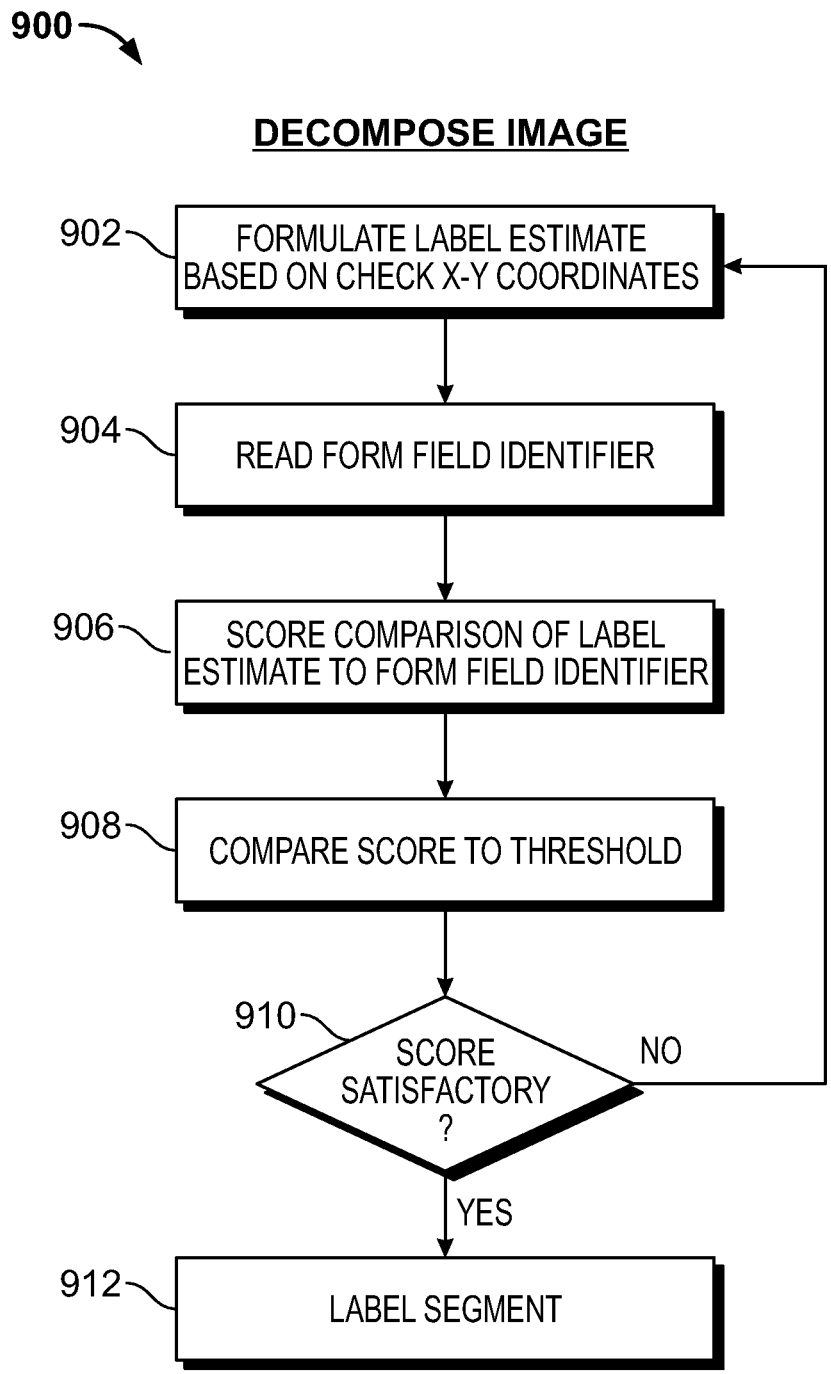
FIG. 9 shows illustrative elements of yet another process in accordance with the principles of the invention.

FIG. 9 shows illustrative process 900 for decomposing the image. The system may execute one or more of the steps of process 900 in connection with the execution of step 804 of process 800 (shown in FIG. 8). Process 900 may begin at step 902. At step 902, the system may formulate a label estimate for a segment based on check X-Y coordinates, such as those discussed in connection with FIG. 6. A segment may be isolated using any suitable object-identification algorithm.

For example, the system may estimate that segment 512 (shown in FIG. 5) is a payee segment based on values of its x and y coordinates. Y coordinates near or above the y midpoint of the check and x coordinates that span from near the left margin of the check to a central right portion of the check may be associated with payee segments.

At step 904, the system may read a form field identifier. The form field identifier associated with payee segment 512 is form field identifier 532 ("PAY TO THE ORDER OF:"). At step 906, the system may score a comparison of label. The system may perform character recognition on the form field identifier.

At step 906, the system may score a comparison of the label estimate to form field identifier 532. The system may estimate the likelihood that the characters of form field identifier 532 correspond to a payee segment. Any suitable index of the likelihood may be used to score the comparison.

At step 908, the system may compare the score to a threshold. The threshold may include, for example, a confidence interval or limit.

At step 910, the system may determine if the score is satisfactory. If the score does not meet or exceed the threshold, process 900 may continue at step 902 to re-estimate the segment label. If the score does meet or exceed the threshold, process 900 may continue at step 912. At step 912, the system may label the segment. For example, the system may label segment 512 of check image 500 (shown in FIG. 5) as "PAYEE." The content of segment 512 may be associated with the "PAYEE" label in transaction record 100 (shown in FIG. 1).

Figure 10:
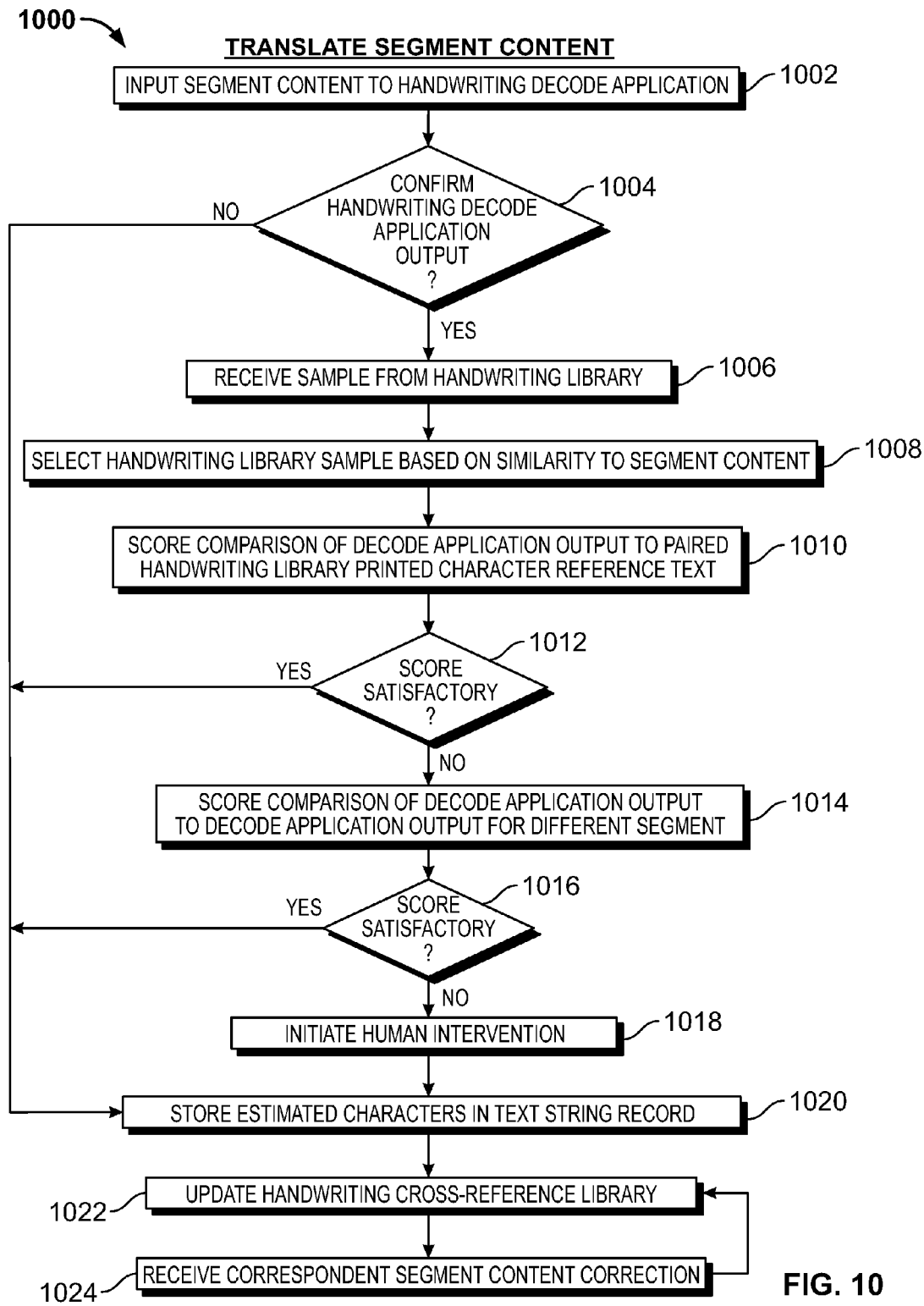
FIG. 10 shows illustrative elements of still another process in accordance with the principles of the invention.

FIG. 10 shows illustrative process 1000 for translating segment content. The system may execute one or more of the steps of process 1000 in connection with the execution of step 806 of process 800 (shown in FIG. 8). Process 1000 may begin at step 1002. At step 1002, the system may input segment content to a handwriting decoding application. Any suitable handwriting decoding application may be used. For example, the system may use. The handwriting decoding application may output estimated characters that corresponds to the segment content.

At step 1004, the system may determine whether to confirm the estimated characters. For example, the system may include a switch that configures the system to confirm the estimated characters. The switch may be conditional. For example, the switch may be set for confirmation of only segments that are associated with selected label. For example, the system may confirm only estimated characters that correspond to payee segment content. The switch may be set for confirmation of only selected estimated characters. For example, the system may confirm only estimated characters that correspond to selected payees. The selected payees may be selected based on past errors in estimation of the payee name. The past errors may be identified by the system. The past errors may be identified by the customer.

If at step 1004 the system determines to not confirm the handwriting decode application output, process 1000 may continue at step 1020. At step 1020, the system may store the estimated characters in a transaction record such as transaction record 100 (shown in FIG. 1). When the estimated characters are based on segment 532 of check image 500 (shown in FIG. 5), the estimated characters may be "PAYEE, INC." The characters "PAYEE, INC." may therefore be stored in payee field 106 of transaction record 100.

At step 1022, the system may update handwriting library 706 by appending the content of segment 532 and the estimated characters "PAYEE, INC." to library 706.

At step 1024, the system may receive from a customer a segment content correction. For example, the system may provide to the customer a view of the segment content and a view of the estimated characters that correspond to the segment content. The customer may provide to the system a correction of the estimated characters. If the customer provides the correction, process 1000 may continue at step 1022.

If at step 1004 the system determines to confirm the handwriting decode application output, process 1000 may continue at step 1006. At step 1006, the system may identify a first handwriting sample in handwriting library 706 (shown in FIG. 7).

At step 1008, the system may identify a second handwriting sample from handwriting library 706. The system may select, from the first and second handwriting samples, that handwriting sample that most closely matches the input segment content. The system may use any suitable pattern recognition algorithm and any suitable quantitative approach to select the most closely matching handwriting sample.

At step 1010, the system may score a comparison between the handwriting decode application output generated in step 1002 and the most closely matching handwriting library printed character reference text.

At step 1012, the system may determine whether the score of step 1010 is satisfactory. If the score is satisfactory, process 1000 may continue at step 1020, which is described above along with illustrative subsequent steps.

If at step 1012, the system determines that the score of step 1019 is not satisfactory, process 1000 may continue at step 1014. At step 1014, the system may score a comparison of the decode application output to decode application output for a different segment in the same mail item or mail item part. For example, if the system is not satisfied by a score comparing decode application output for a first segment to a library sample or samples, the system may decode a second segment from the same mail item or mail item part, whether or not the second segment has been translated and stored in the library. The system may translate the second segment using illustrative steps of process 1000. If the second segment translates well, for example, based on a score such as that in step 1010, the system may compare the first segment's decode application output to the translation of the second segment. The system may score the comparison.

The second segment may include printed character text. For example, the printed character text may be present in a segment such as segment 602 in back check image 600 (shown in FIG. 6). Because segment 602 may include payee information, and may include printed character text, the system may use a decode application output based on segment 602 content as a basis for confirming the decoding of content from payee segment 512 in front check image 500 (shown in FIG. 5).

The system may perform sub-segment pattern analysis. The system may identify a handwritten letter of the alphabet based on a corresponding printed character reference text. The pattern of the handwritten letter may then be used to identify a letter in a segment that requires decoding.

If the score is satisfactory, process 1000 may continue at step 1020, which is described above along with illustrative subsequent steps.

If the score is unsatisfactory, process 1000 may continue at step 1018. At step 1018, human intervention may be initiated. The human intervention may involve a financial institution agent. The agent may be an employee, an appointee, a partner a contractor or any other suitable agent. The agent may view the segment content and provide the system with a translation into printed characters.

Process 1000 may continue at step 1020, which is described above along with illustrative subsequent steps.

Figure 12:
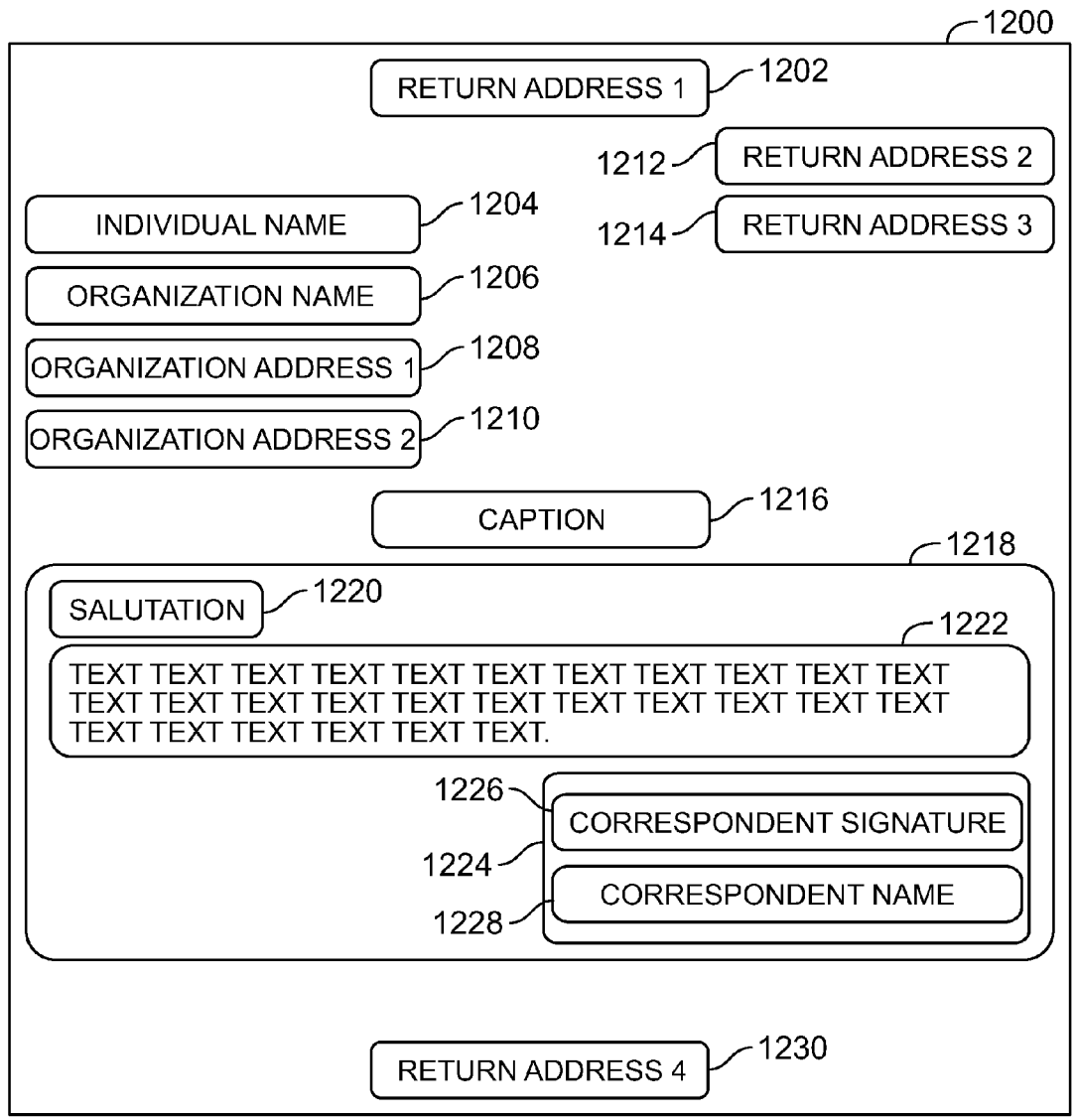
FIG. 12 shows still another illustrative work piece that may be processed in accordance with the principles of the invention.
Figure 13:
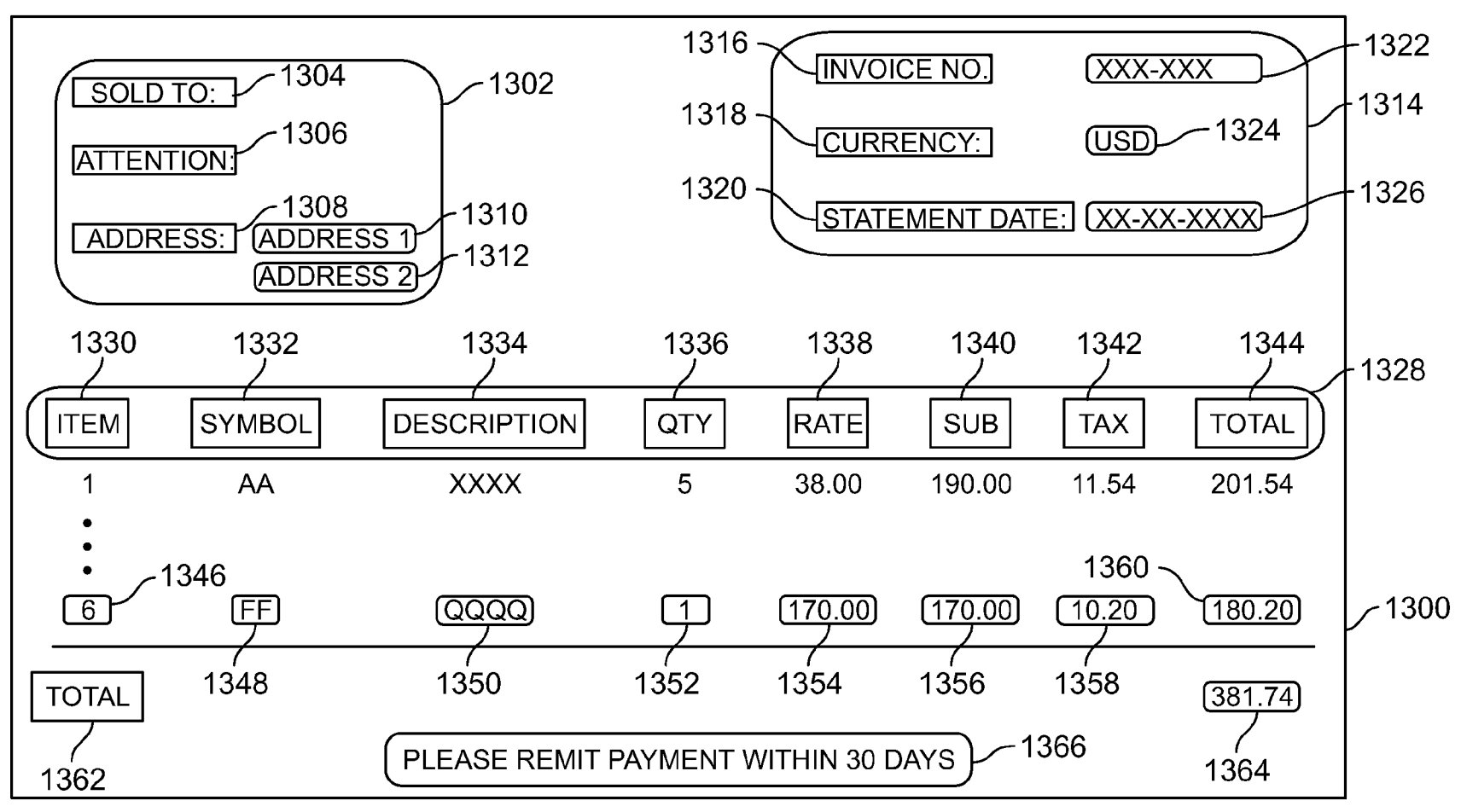

FIGS. 11-13 illustrate document segments and form fields that may be decomposed into text strings in a manner that is similar to the manner in which check 500 segments may be decomposed as shown and described in connection with FIGS. 5-10.

FIG. 11 shows illustrative payment coupon 1100. Payment coupon 1100 may include one or more of detach-here segment 1102, change-of-address-check-box segment 1104, form code segment 1106, customer-name segment 1108, customer-address-segment 1110, customer-address-2 segment 1112, customer-or-account-identifier-bar-code segment 1114, account-number segment 1116, balance segment 1118, minimum-payment-amount segment 1120, due-date segment 1122, amount-enclosed segment 1124, organization-name segment 1126, organization-address-1 segment 1128, organization-address-2 segment 1130, organization-bar-code-segment 1132 and any other suitable segment.

FIG. 12 shows illustrative letter 1200. Letter 1200 may include return address segment 1202, individual-name segment 1204, organization-name segment 1206, organization-address-1 segment 1208, organization-address-2 segment 1210, return-address-1 segment 1212, return-address-3 segment 1214, caption segment 1216, letter-body segment 1218, salutation segment 1220, message segment 1222, signature-block segment 1224, correspondent-signature segment 1226, correspondent name 1228, return-address-4 segment 1230 and any other suitable segment.

FIG. 13 shows illustrative invoice 1300. Invoice 1300 may include organizational-identity segment 1302. Segment 1302 may include entity-identifier form field 1304, individual-identifier form field 1306, organization-address form field 1308, organization-address-1 segment 1310, organization-address-1 segment 1312 and any other suitable form fields or segments. Invoice 1300 may include invoice-general segment 1314. Segment 1314 may include invoice-no. form field 1316, currency-identifier form field 1318, statement-date form field 1320, invoice-no. segment 1322, currency-indicator segment 1324, date segment 1326 and any other suitable form fields or segments.

Invoice 1300 may include header segment 1328. Segment 1328 may include item form field 1330, symbol form field 1332, description form field 1334, quantity form field 1336, rate form field 1338, subtotal form field 1340, tax form field 1342, total form field 1344, item-identifier segment 1346, item-symbol segment 1348, which may identify a type of merchandise, item-description segment 1350, quantity segment 1352, rate segment 1354, subtotal segment 1356, tax segment 1358, total segment 1360 and any other suitable form field or segment.

Invoice 1300 may include total form field 1362. Invoice 1300 may include total-amount segment 1364. Invoice 1300 may include remittance-instruction segment 1366.

Figure 14:
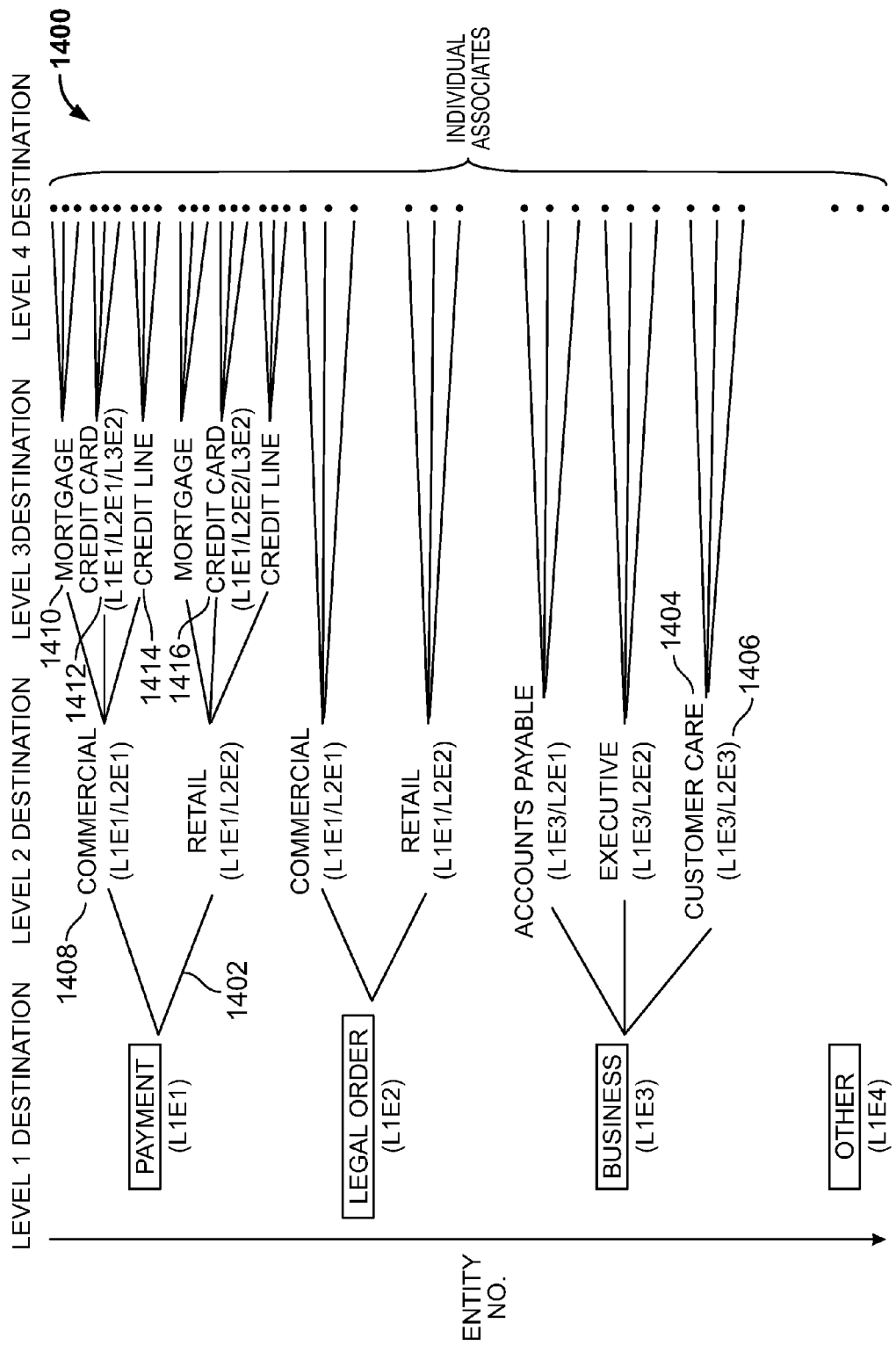
FIG. 14 shows illustrative information that may be used in accordance with the principles of the invention.

FIG. 14 shows illustrative organization chart 1400 for the organization. Organization chart 1400 includes relationship lines such as 1402 that show relationships between entities, such as entities 1404, 1408, 1410, 1412, 1414 and 1416. Level 1 entities are the highest level entities. Level 4 entities are the lowest level entities. Level 4 entities may include individual organization associates. The organization may have any number of levels of entities.

One or more of the entities in the chart may be a destination ("$D_n$," n=1 . . . N, for N destinations) for the mail item or mail item part. A destination identifier may be assigned to one or more of the entities in the chart. The destination identifier may identify the level at which the entity is placed. The destination identifier may distinguish the entity from other entities at the same level and under the same super-entity. For example, destination identifier 1406 may identify CUSTOMER CARE entity 1404. CUSTOMER CARE entity 1404 is the third entity, under super-entity BUSINESS, at Level 2. Destination identifier 1406 is therefore "L1E3/L2E3." The rightmost portion ("L2E3") of identifier 1406 identifies the entity as being a third entity ("E3") at Level 2 ("L2"). The remainder ("L1E3/") identifies super-entity BUSINESS as the super-entity that includes CUSTOMER CARE. Destination identifier 1406 is thus unique for the organization. Destination identifiers corresponding to some or all of the rest of the entities in the organization may be provided (but, for the sake of clarity, are not all shown).

A library vector may be associated with one or more of the destinations in chart 1400.

Figure 15:
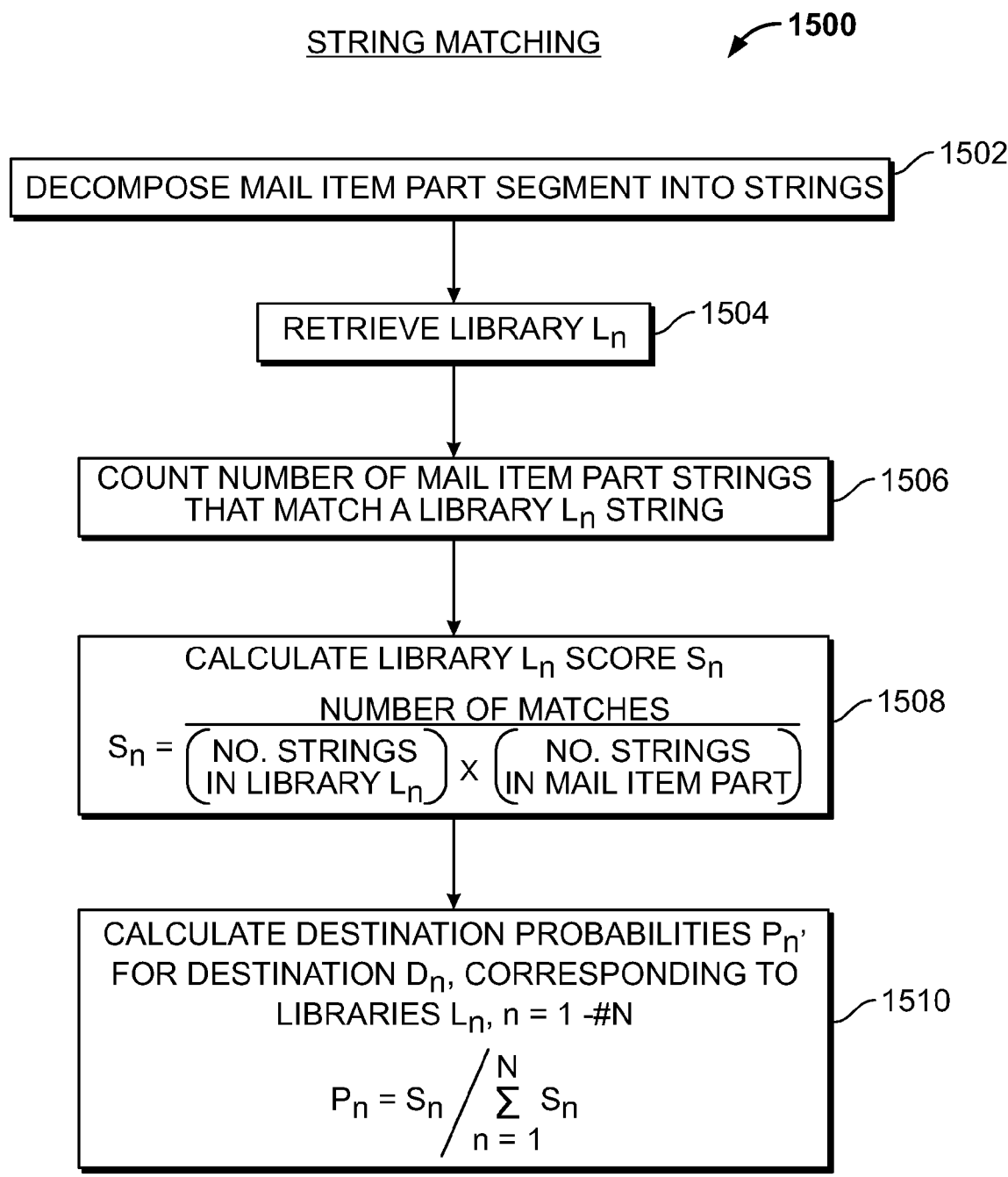
FIG. 15 shows illustrative elements of still another process in accordance with the principles of the invention.

FIG. 15 shows illustrative process 1500 for quantifying probability Pn that a mail item or mail item part is "belongs" (or should be routed) to a destination in chart 1400. Process 1500 may begin at step 1502. At step 1502, the system may decompose a mail item part segment into strings. The strings may be arranged in a string vector. At step 1504, the system may retrieve a library vector for one or more of the destinations in chart 1400. At step 1506, the system may count the number of strings in the string vector that match a string in the library vector for library n. At step 1508, the system may calculate score Sn, which indicates the closeness of matching between the string vector and library vector $L_n$, for example, using Equation 2. At step 1510, the system may calculate probability Pn, which indicates the probability that destination $D_n$ is the correct destination for the mail item part, for example, using Equation 3. The mail item part may be routed to the destination $D_n$ having the highest probability Pn.

Figure 16:
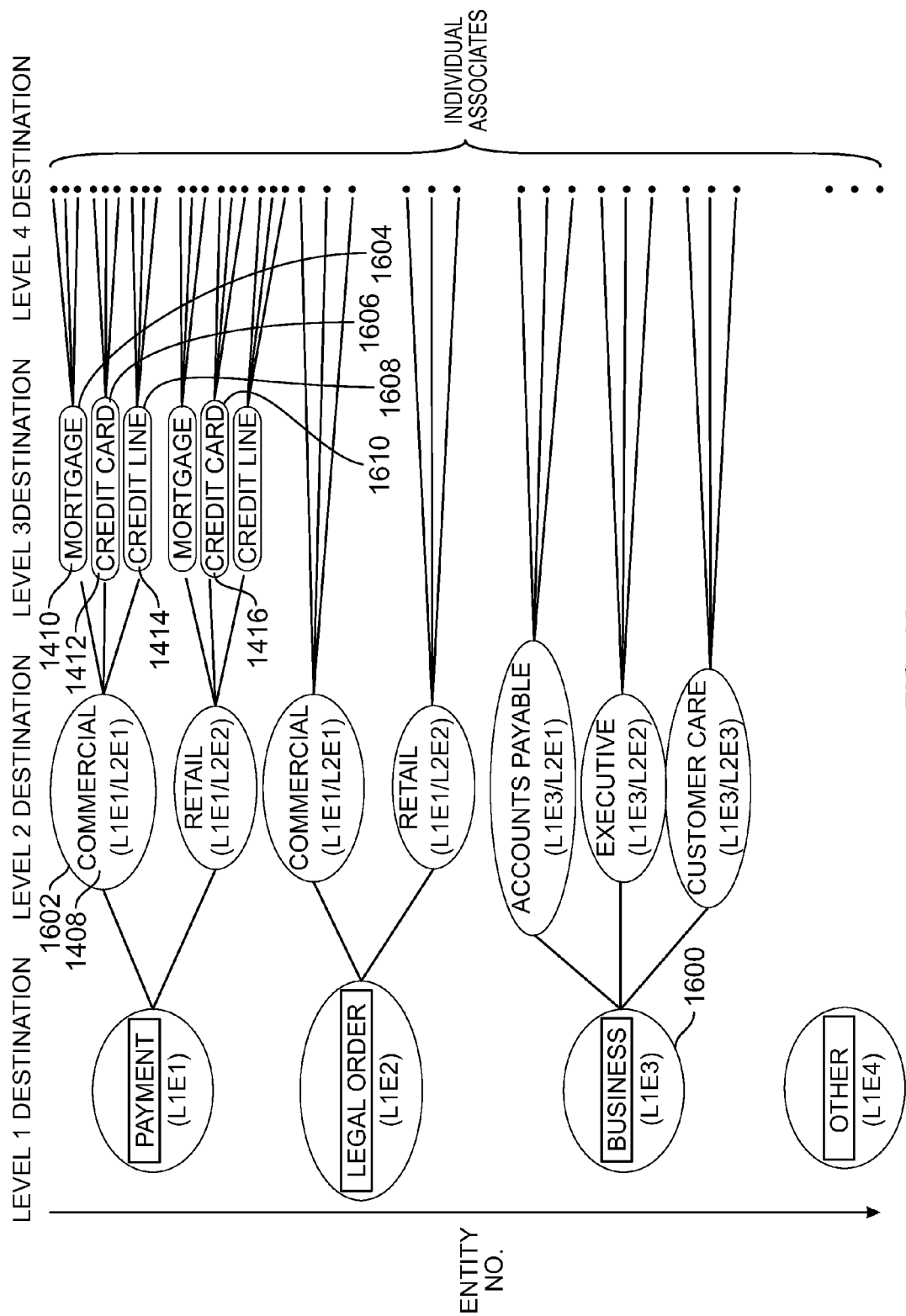
FIG. 16 shows the illustrative information of FIG. 14 along with other illustrative information in accordance with the principles of the invention.

FIG. 16 shows organizational chart 1400 (shown in FIG. 14) overlain by clusters 1600 (including, for example, clusters 1602, 1604, 1606, 1608 and 1610) that may be defined, for example, using Equation 4, when M=N. Each of the N destinations Dn corresponds to its own cluster Cn, which is one of M clusters. The mean values of the clusters may be used as proxy libraries for the destinations. In Equation 3, therefore, closeness between the string vector and the libraries may be calculated using the mean cluster values instead of the library values and the mail item part may be routed to the destination corresponding to the closest mean cluster to the mail item part.

Figure 17:
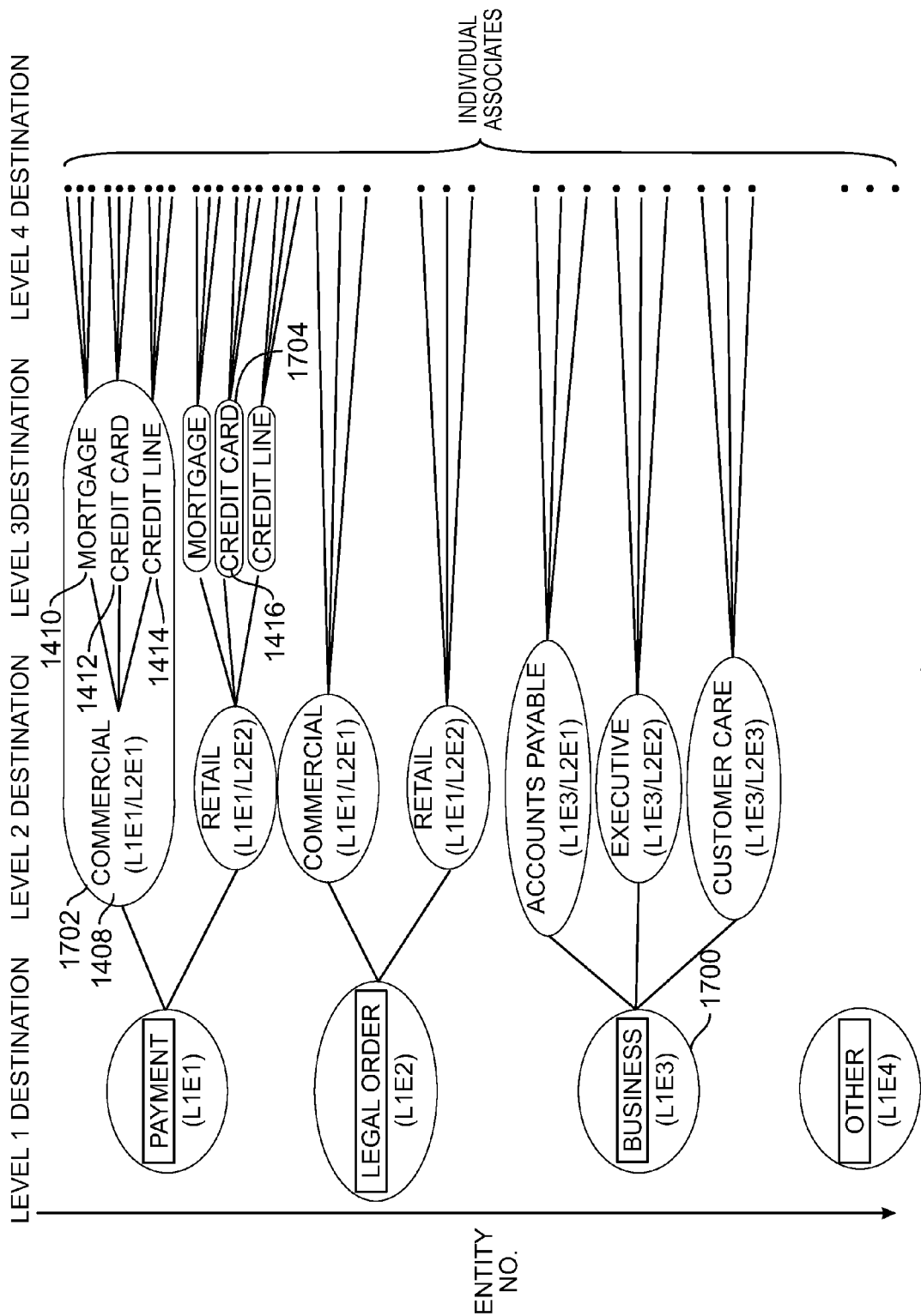
FIG. 17 shows the illustrative information of FIG. 14 along with other illustrative information in accordance with the principles of the invention.

FIG. 17 shows organizational chart 1400 (shown in FIG. 14) overlain by clusters 1700 (including clusters 1702 and 1704) that may be defined, for example, using Equation 4, when M is selected to be less than N. When M is selected to be less than N, the destinations must be "fit" into a small number of clusters than the number of destinations, so proxy destinations may merge into each other. For example, cluster 1702 has subsumed clusters 1602, 1604, 1606 and 1608 of clusters 1600 (shown in FIG. 16). Cluster 1702 may become a proxy destination. Cluster 1702 may define a proxy destination that corresponds to entities 1408, 1410, 1412 and 1414. The mail item part may be routed to the cluster 1702 proxy destination. The mail item part may be further routed after receipt at the proxy destination.

The cluster 1702 proxy destination encompasses entities that "extend" from a single branch of organization chart 1400.

Figure 18:
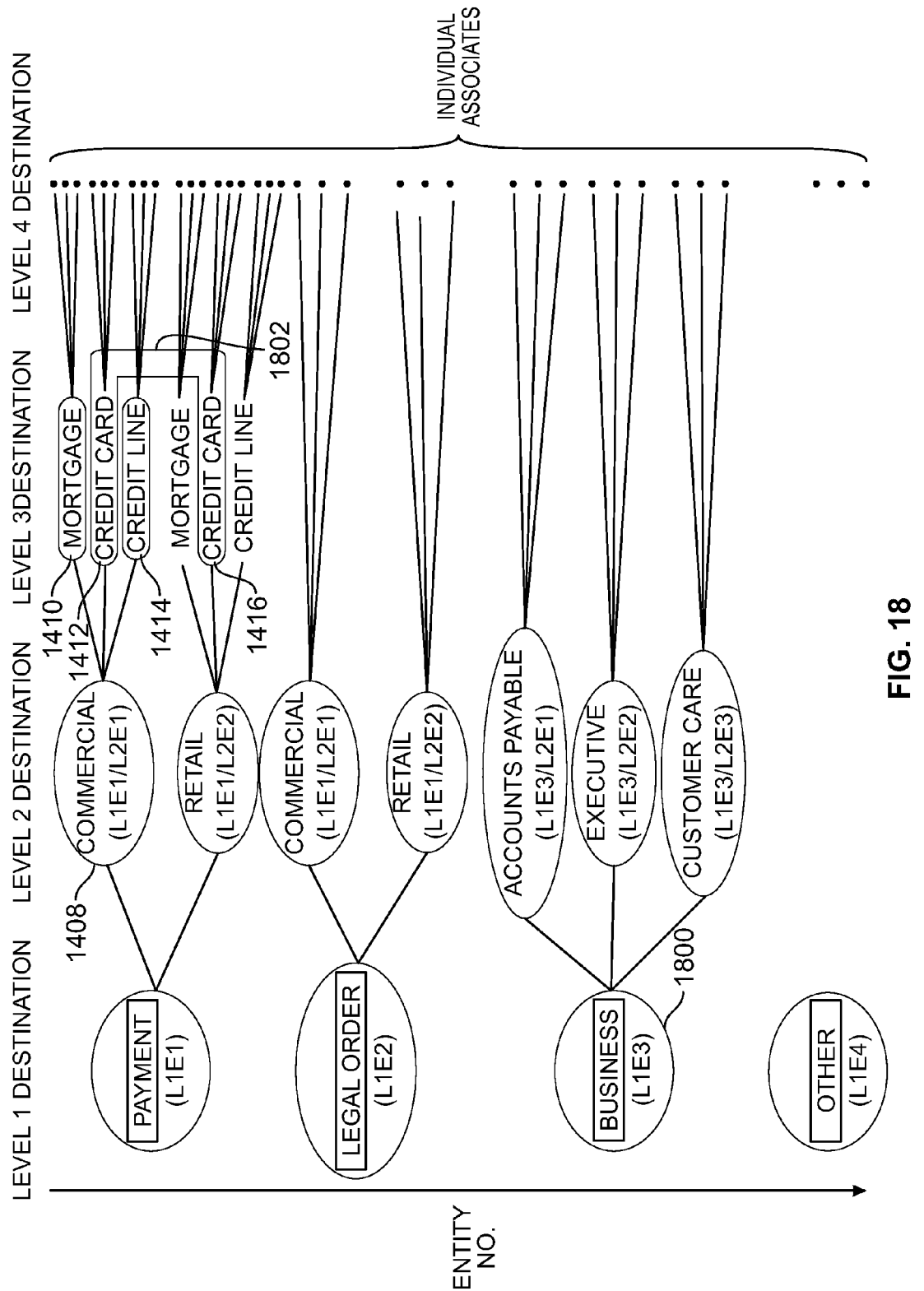
FIG. 18 shows the illustrative information of FIG. 14 along with yet other illustrative information in accordance with the principles of the invention.

FIG. 18 shows organizational chart 1400 (shown in FIG. 14) overlain by clusters 1800 that may be defined, for example, using Equation 4, when M is selected to be less than N (and different from the M selected for clusters 1700 (shown in FIG. 17). Cluster 1802 has subsumed clusters 1606 and 1610 of clusters 1600 (shown in FIG. 16). Cluster 1802 may become a proxy destination. Cluster 1802 may define a proxy destination that corresponds to entities 1412 and 1416. The mail item part may be routed to the cluster 1802 proxy destination. The mail item part may be further routed after receipt at the proxy destination.

The cluster 1802 proxy destination encompasses entities that "extend" from multiple branches of organization chart 1400.

Thus, apparatus, methods, articles of manufacture including computer readable code, and media for processing a mail item have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for routing a mail item, the mail item including a mail item part comprising a document originating from the mail item, the apparatus comprising:
    a processor device; and
    machine readable memory;
    wherein the processor device is configured to:
        assign a unique destination identifier to an organizational entity;
        aggregate documents that were addressed to the entity and received by the entity, the documents comprising mail item parts known to be correctly routed to the entity;
        identify unique terms in the aggregated documents; and
        store in the machine readable memory:
            the unique destination identifier assigned to the organizational entity; and
            a library that corresponds to the organizational entity and includes the unique terms;
    wherein, when the unique terms are first unique terms, the unique destination identifier is a first unique destination identifier and the library is a first library;
        the machine readable memory includes a second unique destination identifier and a second library that includes second unique terms and corresponds to a second organizational entity, the first and second libraries being members of a plurality of libraries corresponding to different organizational entities; and
    the processor device is configured to:
        define a plurality of clusters based on a union of the libraries;
        determine that the first unique terms and the second unique terms are both closer to one of the clusters than all of the other clusters; and
        define a proxy destination, the proxy destination comprising a destination that includes both the first organizational entity and the second organizational entity.

2. The apparatus of claim 1 wherein the processor device is further configured to route the mail item part to an organizational entity only if the library that corresponds to the organizational entity quantitatively matches the mail item part better than a different library matches the mail item part.

3. The apparatus of claim 2 wherein, when the mail item part is a first mail item part, the processor device is further configured to route a second mail item part to the organizational entity, the first mail item part and the second mail item part originating from the same mail item, and the second mail item part matching both the library and the different library less than a threshold matching value.

4. The apparatus of claim 1 wherein
    if
        the first organizational entity is a sub-entity of the second organizational entity, the proxy destination includes the first organizational sub-entity and the second organizational entity.

5. The apparatus of claim 1 wherein the processor device is further configured to:
    identify in the first unique terms a name that corresponds to the first organizational entity; and
    route the mail item part to the first organizational entity instead of the proxy destination.

6. The apparatus of claim 1 wherein
    if
        the first organizational entity is not a sub-entity of the second organizational entity, the proxy destination comprises a third organizational entity that includes both the first organizational entity and the second organizational entity, the first organizational entity.

7. The apparatus of claim 1 wherein the processor device is further configured to:
    identify in the first unique terms a name that corresponds to the first organizational entity; and
    route the mail item part to the first organizational entity instead of the proxy destination.

8. An article of manufacture comprising a non-transitory computer usable medium having computer readable program code embodied therein, the code when executed by a processor causing a computer associated with an organization to route a mail item part, the mail item part comprising a document, the computer readable program code in the article comprising:
    computer readable program code for causing the computer to assign a unique destination identifier to an organizational entity;
    computer readable program code for causing the computer to aggregate documents that were addressed to the entity and received by the entity, the documents comprising mail item parts known to be correctly routed to the entity;
    computer readable code for causing the computer to identify unique terms in the aggregated documents; and
    computer readable program code for causing the computer to store in machine memory:
        the unique destination identifier assigned to the organizational entity; and
        a library that corresponds to the organizational entity and includes the unique terms;
wherein, when the unique terms are first unique terms, the unique destination identifier is a first unique destination identifier and the library is a first library;
    computer readable program code for causing the computer to store in machine memory a second unique destination identifier and a second library that includes second unique terms and corresponds to a second organizational entity, the first and second libraries being members of a plurality of libraries corresponding to different organizational entities;
computer readable program code for causing the computer to:
define a plurality of clusters based on a union of the libraries;
determine that the first unique terms and the second unique terms are both closer to one of the clusters than all of the other clusters; and
define a proxy destination, the proxy destination comprising a destination that includes both the first organizational entity and the second organizational entity.

9. The article of claim 8 further comprising computer readable program code for causing the computer to route the mail item part to an organizational entity only if the library that corresponds to the organizational entity quantitatively matches the mail item part better than a different library matches the mail item part.

10. The article of claim 9 further comprising, when the mail item part is a first mail item part, computer readable program code for causing the computer to route a second mail item part to the organizational entity, the first mail item part and the second mail item part originating from the same mail item, and the second mail item part matching both the library and the different library less than a threshold matching value.

11. The article of claim 8 further comprising,
computer readable program code for causing the computer to define,
if
the first organizational entity is a sub-entity of the second organizational entity, a proxy destination that includes the first organizational sub-entity and the second organizational entity.

12. The article of claim 8 further comprising:
computer readable program code for causing the computer to identify in the first unique terms a name that corresponds to the first organizational entity; and
computer readable program code for causing the computer to route the mail item part to the first organizational entity instead of the proxy destination.

13. The article of claim 8 further comprising
computer readable program code for causing the computer to define,
if
the first organizational entity is not a sub-entity of the second organizational entity, a proxy destination comprising a third organizational entity that includes both the first organizational entity and the second organizational entity, the first organizational entity and the second organizational entity being sub-entities of the third organizational entity.

14. The article of claim 8 further comprising:
computer readable program code for causing the computer to identify in the first unique terms a name that corresponds to the first organizational entity; and
computer readable program code for causing the computer to route the mail item part to the first organizational entity instead of the proxy destination.

15. One or more non-transitory computer-readable media storing computer-executable instructions which, when executed by a processor on a computer system, perform a method for routing a mail item, the method comprising:
assigning a unique destination identifier to an organizational entity;
aggregating documents that were addressed to the entity and received by the entity, the documents comprising mail items known to be correctly routed to the entity;
identifying unique terms in the aggregated documents; and
storing in machine memory:
the unique destination identifier assigned to the organizational entity; and
a library that corresponds to the organizational entity and includes the unique terms;
wherein, when the unique terms are first unique terms, the unique destination identifier is a first unique destination identifier and the library is a first library:
storing in machine memory a second unique destination identifier and a second library that includes second unique terms and corresponds to a second organizational entity, the first and second libraries being members of a plurality of libraries corresponding to different organizational entities;
defining a plurality of clusters based on a union of the libraries;
determining that the first unique terms and the second unique terms are both closer to one of the clusters than all of the other clusters; and
defining a proxy destination, the proxy destination comprising a destination that includes the first organizational entity and the second organizational entity.

16. The media of claim 15 wherein the method further comprises routing the mail item to an organizational entity only if the library corresponding to the organizational entity quantitatively matches the mail item better than a different library matches the mail item.

17. The media of claim 16 wherein, when the mail item is a first mail item part, the method further comprises routing a second mail item part to the organizational entity, the first mail item part and the second mail item part originating from the same mail item, and the second mail item part matching both the library and the different library less than a threshold matching value.

18. The media of claim 15 wherein the method further comprises,
if
the first organizational entity is a sub-entity of the second organizational entity, defining a proxy destination that includes the first organizational sub-entity and the second organizational entity.

19. The media of claim 15 wherein the method further comprises:
identifying in the first unique terms a name that corresponds to the first organizational entity; and
routing the mail item to the first organizational entity instead of the proxy destination.

20. The method of claim 15 wherein the method further comprises,
if
the first organizational entity is not a sub-entity of the second organizational entity, defining a third organizational entity that is a proxy destination for the first organizational entity and the second organizational entity, the first organizational entity being sub-entities of the third organizational entity.

21. The media of claim 15 wherein the method further comprises:
identifying in the first unique terms a name that corresponds to the first organizational entity; and routing the mail item to the first organizational entity instead of the proxy destination.

\* \* \* \* \*